UNITED STATES PATENT OFFICE.

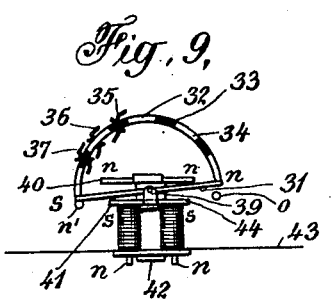

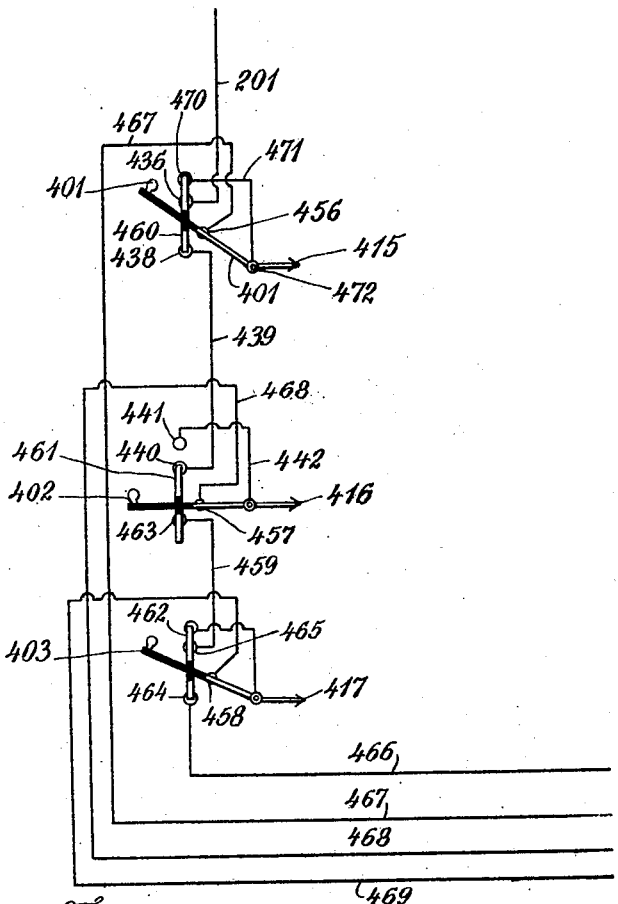
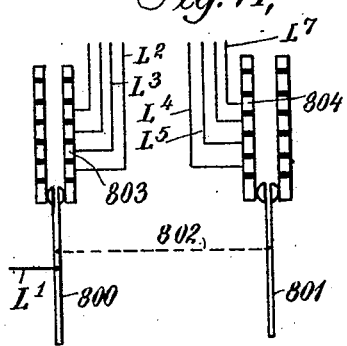
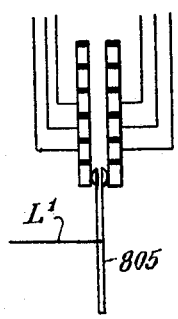
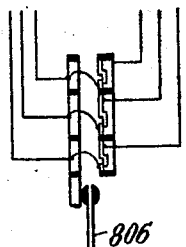

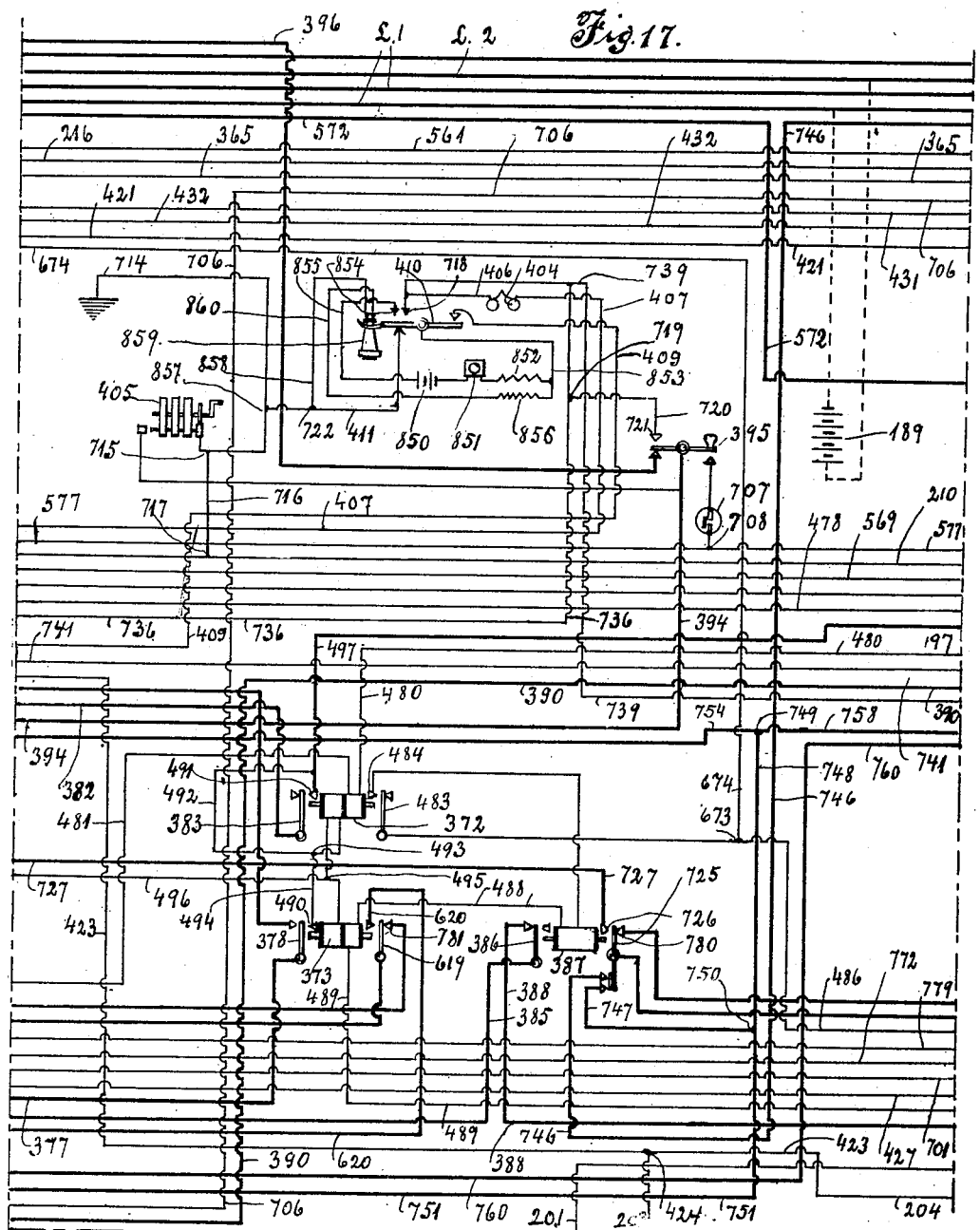

OTTO ASMUSSEN, OF BROOKLYN, NEW YORK.

AUTOMATIC ELECTRIC MULTI-SWITCHING, TESTING, AND SIGNALING SYSTEM.

1,324,420.  Specification of Letters Patent.  Patented Dec. 9, 1919.

Application filed July 3, 1915. Serial No. 37,931.

*To all whom it may concern:*

Be it known that I, OTTO ASMUSSEN, a subject of the King of Denmark, residing at Brooklyn, Kings county, and State of New York, have invented and discovered certain new and useful Improvements in Automatic Electric Multi-Switching, Testing, and Signaling Systems, of which the following is a specification.

The purpose of the invention is to provide means for automatic telephone interconnection in city or rural telephone systems whereby the subscribers may be enabled to establish mutual communication between themselves without manually operated switchboards.

Another object of the invention is to provide means for accomplishing interurban interconnection from a trunk line into a number of small local telephone systems, whereby a central station is enabled to operate connections into such trunk lines automatically.

A further object of the invention is to lock out of connection with the local lines all the intermediate subscribers, or subscribers on local systems, and to lock all local exchange stations out of connection with the trunk lines as far as communication is being established for preventing any of the subscribers from hearing the calling or from overhearing the conversation, and also from being able to interrupt them.

Again it is the object of the invention to provide means for establishing interconnection on interurban lines in direct extension from one place to another on trunk lines without having to effect the combination over the central station.

A further object of the invention is the accomplishement of similar purposes and operations on a one line system with earth connection, but in a somewhat different and more restricted method. This is intended both for telephone and telegraph use. Means are provided wherewith telephone and telegraph stations are enabled to make their local or interurban connections and connect themselves either with the telegraph apparatus directly at a distant station, or with the telephone apparatus at such a station, or with anyone of the subscribers in a town or in a rural district for which this system is mostly intended.

The combination of installations operated in connection with multi-party lines are:
A burglar protection installation.
A fire protection installation.
A testing or controlling installation.
A patrolmen's installation.
A telephone installation.
An entertainment installation.

The invention resides in those novel details of the construction, combination and arrangement of parts all of which will be firstly fully described and then specifically pointed out in the appended claims, reference being had to the accompanying drawings, in which:

Fig. 1 is a partial diagrammatic view of the fire alarm and telephone apparatus of the present system.

Figure 2:
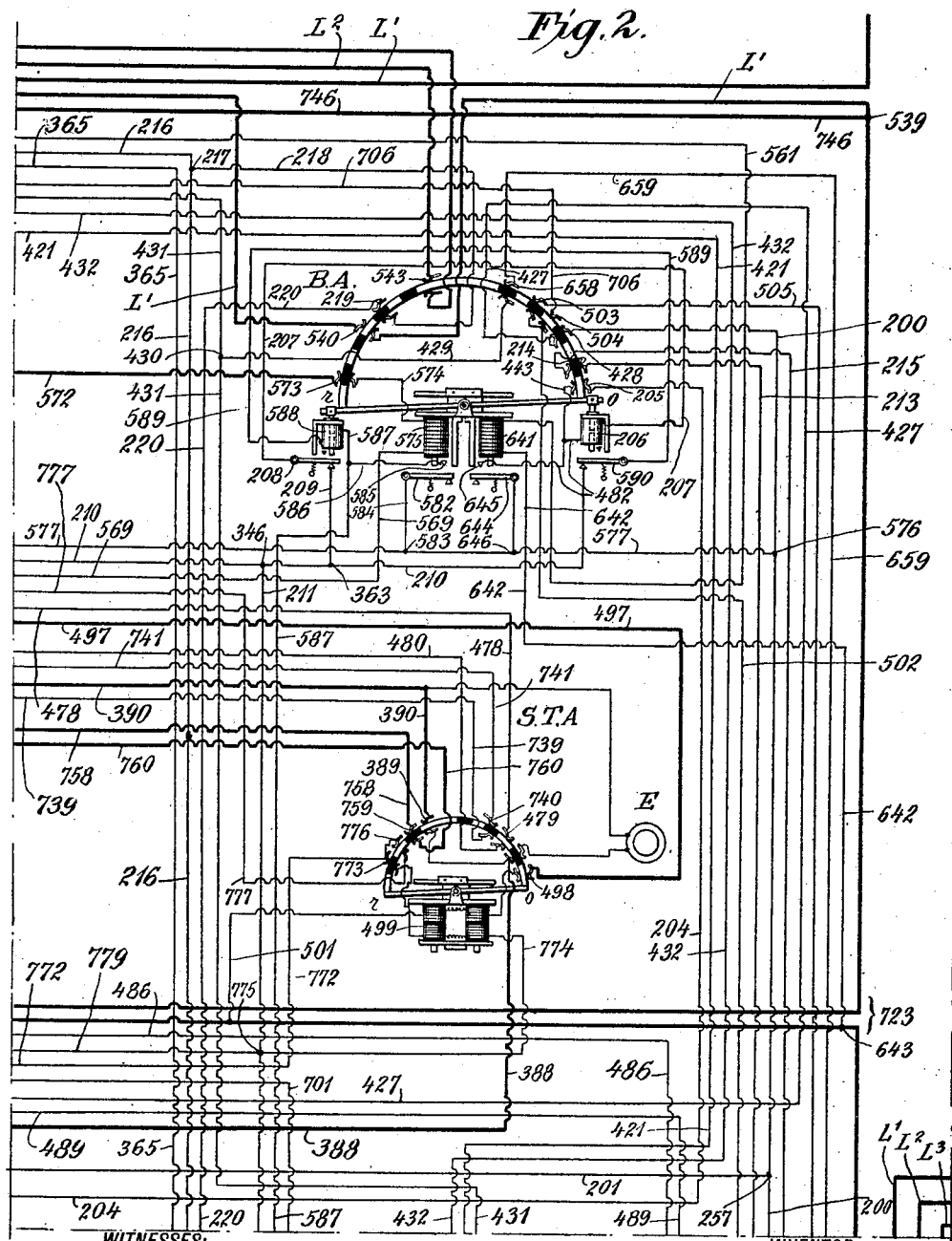

Fig. 2 a partial diagrammatic view of the burglar alarm and telephone apparatus of the present system.

Figure 3:
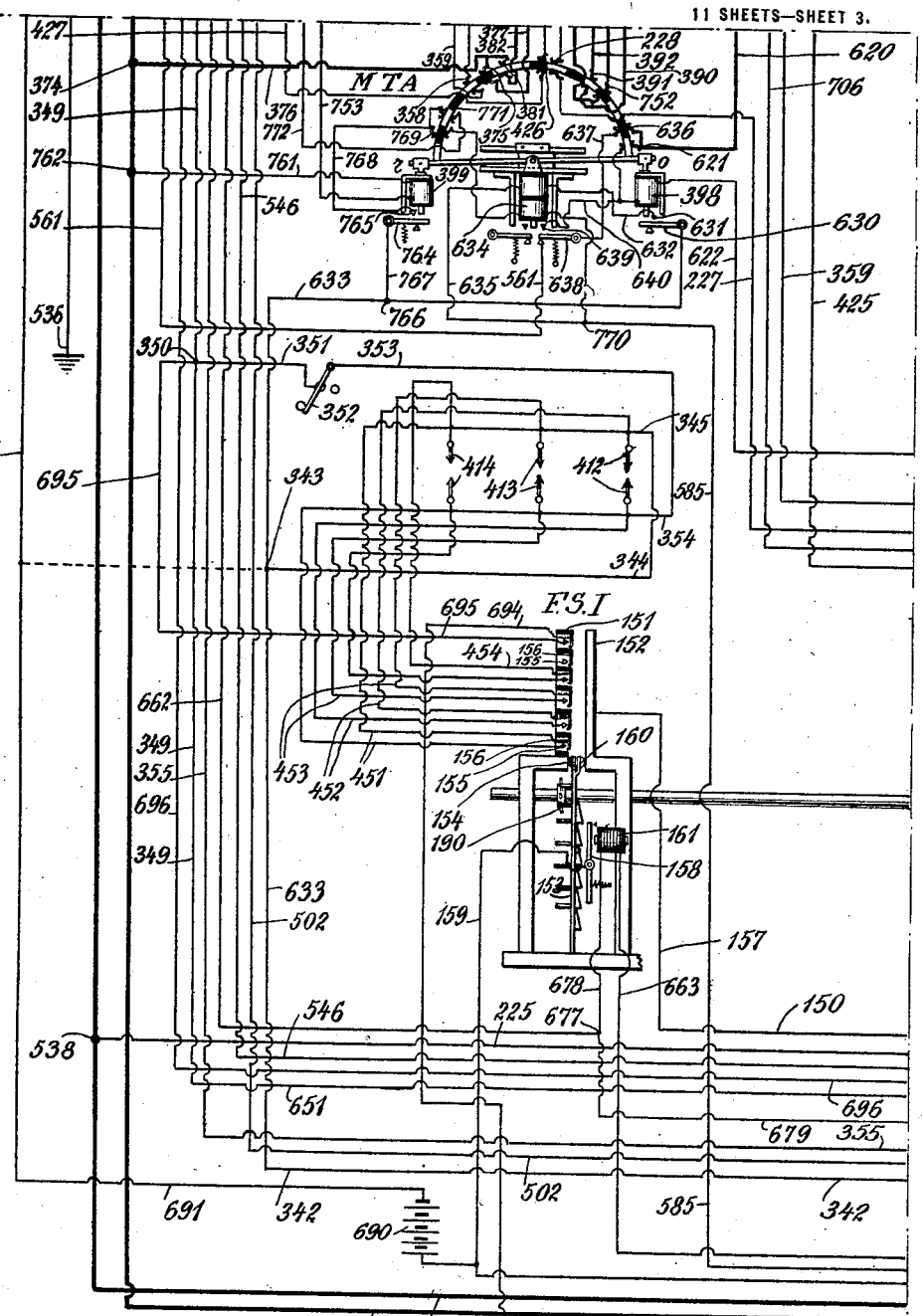

Fig. 3 a partial diagrammatic view of the testing apparatus, the impulsator and current distributing mechanism, and the fire alarm contacts of the system.

Figure 4:
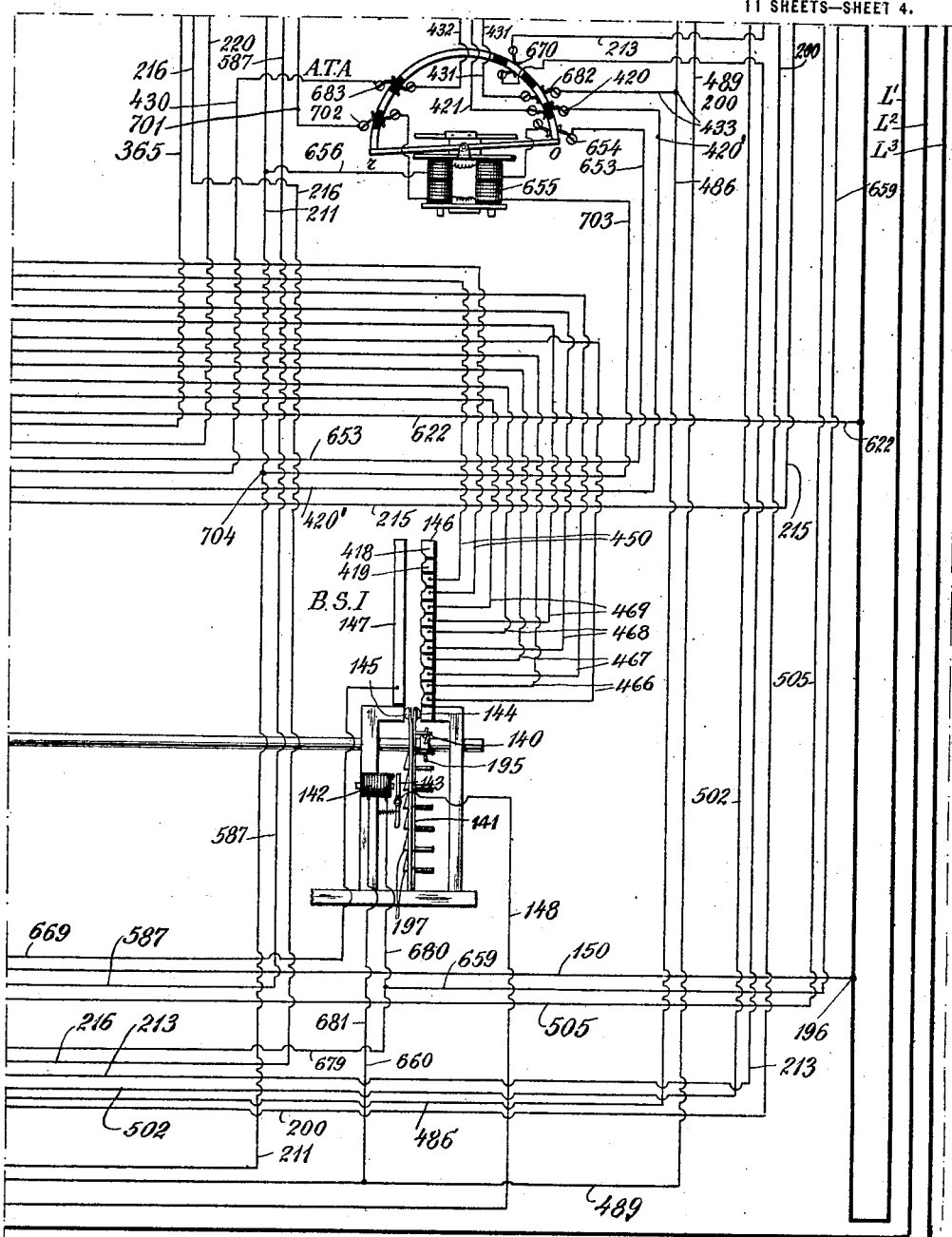

Fig. 4 a partial diagrammatic view of the auxiliary testing apparatus, and the impulsator and current distributing mechanism.

Figure 5:
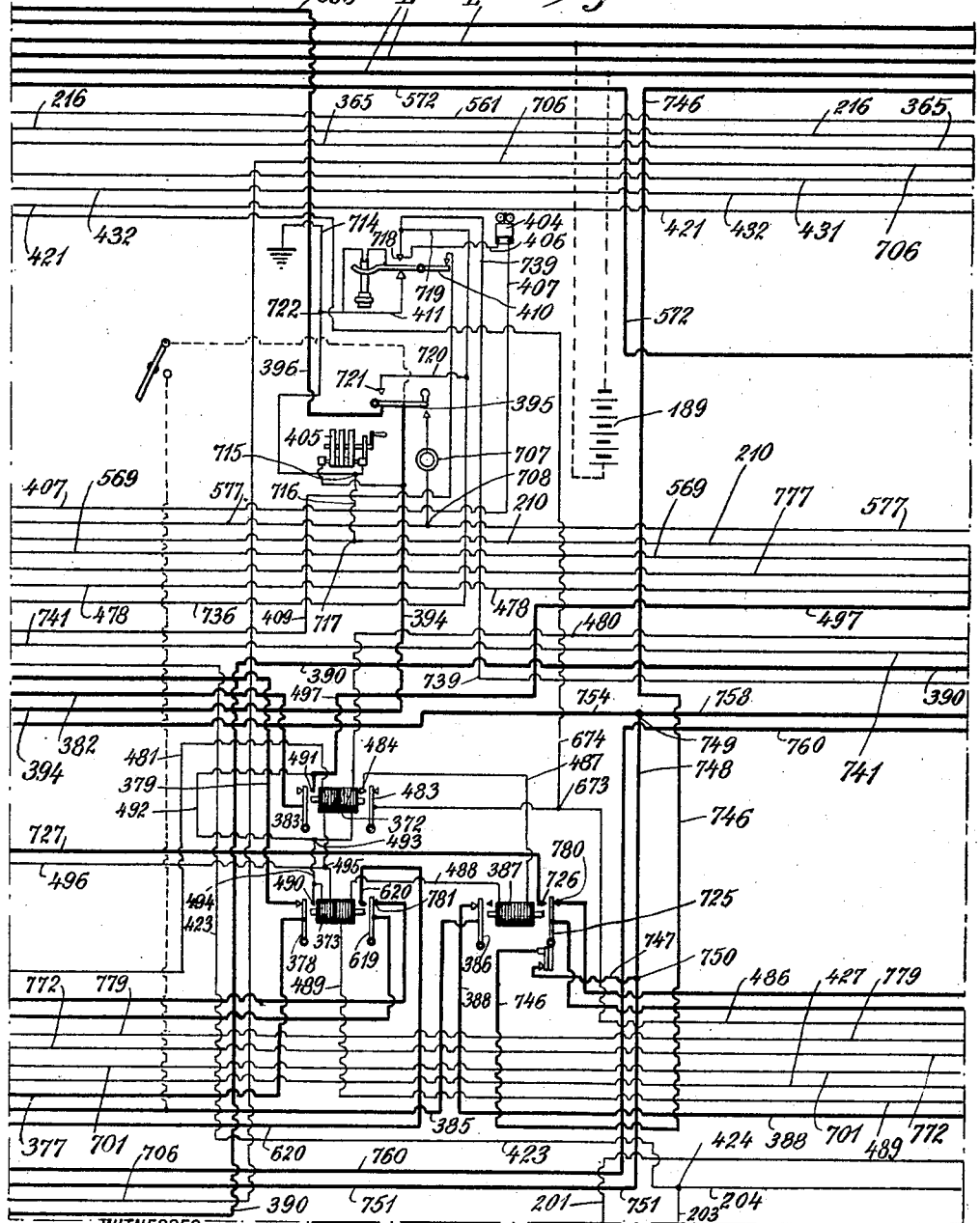

Fig. 5 a partial diagrammatic view of the telephone and testing apparatus.

Figure 6:
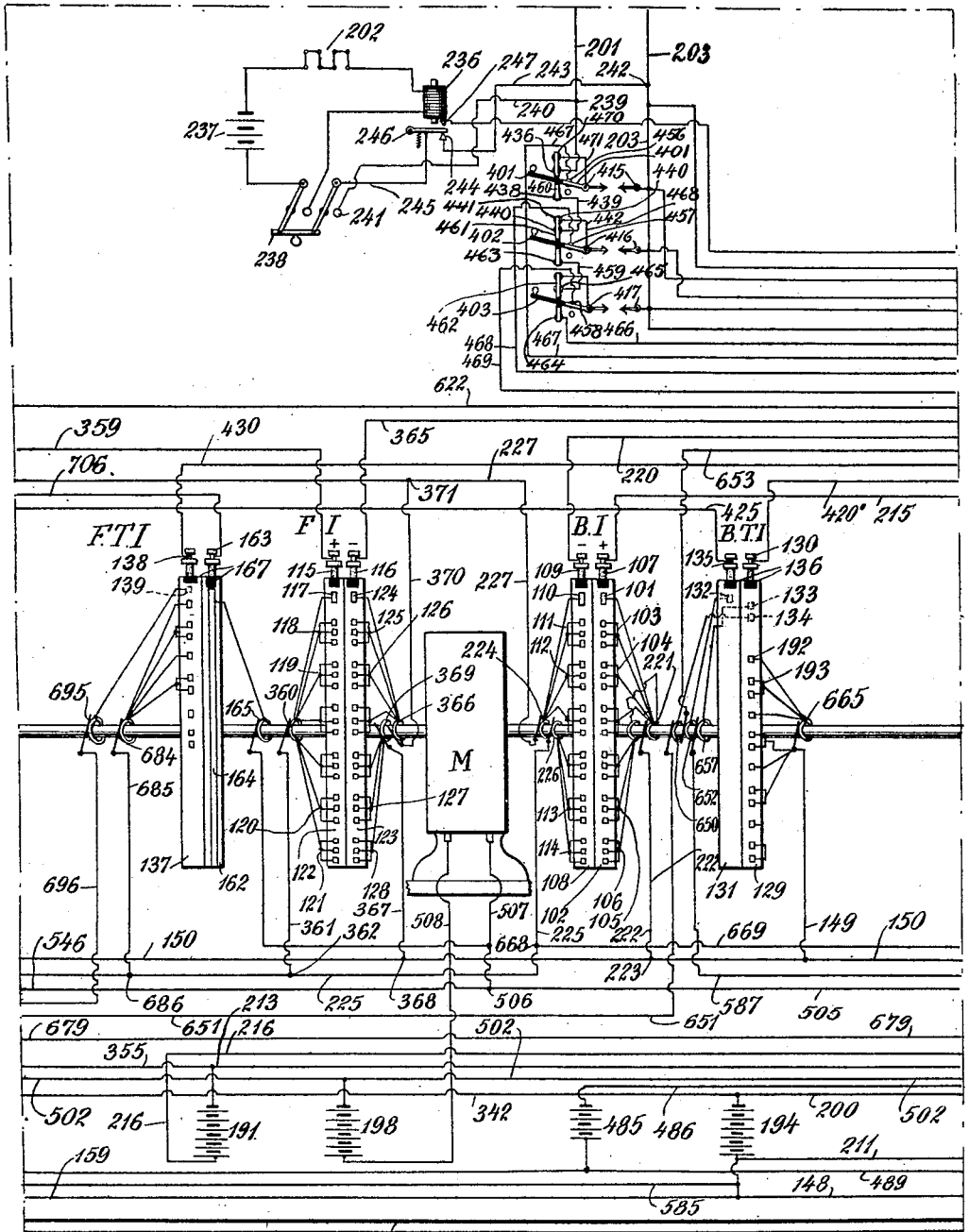

Fig. 6 a partial diagrammatic view of the burglar alarm apparatus, switches, and the impulsator and current distributing mechanism.

Figure 7:
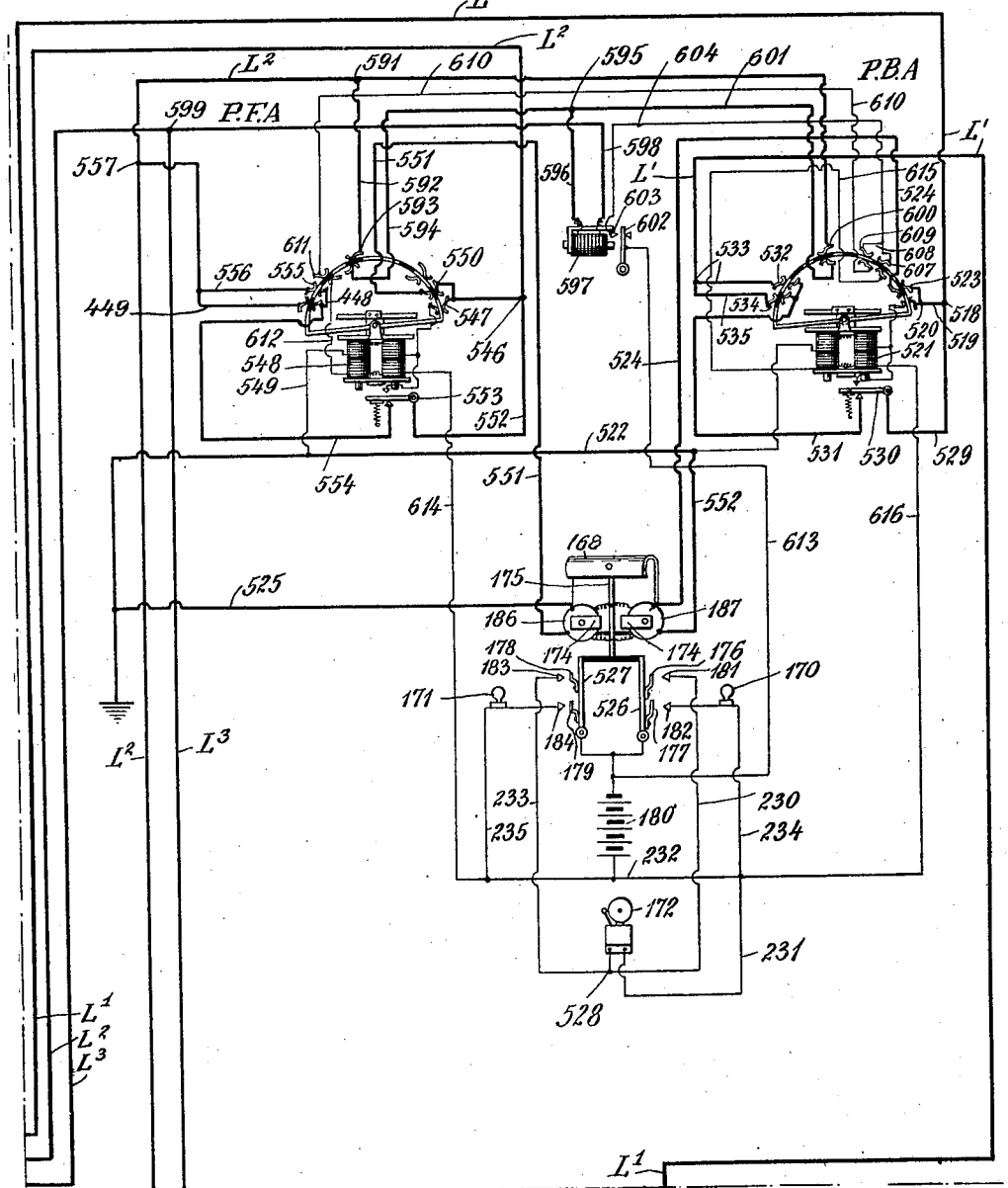

Fig. 7 a partial diagrammatic view of the fire alarm switching, burglar alarm switching, and signaling apparatus.

Figure 8:
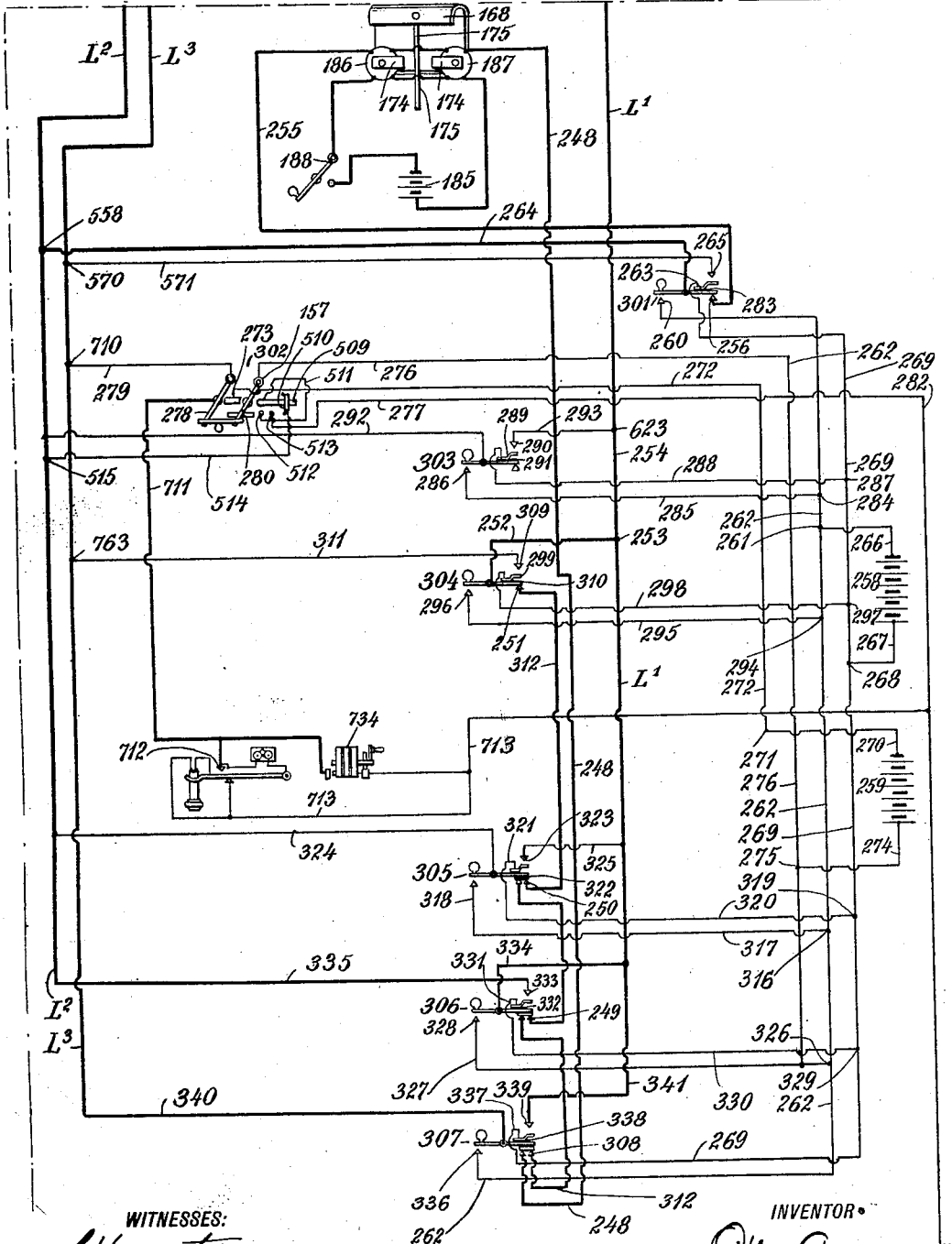

Fig. 8 a partial diagrammatic view of the signaling and testing apparatus of a central station.

Fig. 9 a diagrammatic view of a switch.

Fig. 10 a diagrammatic view of a switch of a single magnet.

Fig. 11 a diagrammatic view of a modified form of switch.

Fig. 12 a diagrammatic view of another type of switch employed.

Fig. 13 a diagrammatic view of a multi-switching apparatus.

Figs. 14, 15 and 16 are diagrammatic views of an interconnecting board for bridging over lines, and Fig. 17 is a detailed diagrammatic view of the telephone circuit.

*Description of the polarized automatic multi-switching and magnet plunger apparatus, and the impulsator and current distributing mechanism with scaling interconnecting board.*

The multi-switching apparatus is a polarized relay with one or with two double wound magnetic coils wound in series. The second winding is wound in the same direction as the first. The one coil relay is generally used for shorter distances, while the two coil relay is used for long distance work.

The arch switching attachment is built on a permanent magnet bar, which rocks or shifts over from one side to the other according to the direction of the current impulses that are impelled or sent through the magnet coils of that apparatus.

The arch switching attachment is provided with conducting and insulating plates, which are moved or shifted into and out of interposition between the fixed contacts associated with the arch shaped attachment.

The contact pair, 45 (Fig. 11), is the pair that lets the current in through the magnet coils, and, this is not closed out of connection until the permanent magnet bar, or the armature 31, is very close to its touching point of the stud $o$.

By reference to Fig. 9, the bar 31 is a permanent magnet, which carries an arch shaped multi-switching device 32, attached to it, provided with alternating conducting and insulating pairs of plates 33 and 34, to operate with the relatively fixed pairs of contacts 35, 36 and 37, the one contact being placed opposite the other with conducting or insulating plates between. According to the oscillatory movement of the arch member 32 the plates 33 and 34 are interposed alternately between the fixed contact pairs, 35, 36 and 37 and thereby the desired function of the interchanging system is attained.

The permanent magnet bar 31 is pivoted at its center on a non-magnetizable metal support and it moves between two inductive magnet bars 40 and 41, which, according to their inductive magnetism, rock, in association with the permanent magnet bar's magnetic force, that bar with its attached multi-switching arrangement over into normal or operated position indicated by $n$ and $o$. Bar 40 joins the yoke 42 and is energized with that yoke's magnetic force. The bar 40 is energized with inverse polarity to that of bar 41, which exerts a double magnetic action on the permanent magnet.

The main line current is generally sufficient to operate said multi-switching apparatus but where a great number of contact-pairs should necessarily be added to the multi-switching attachment, an electromagnet plunger, 46, 77, and 94, Figs. 11 and 12, can be attached at each side of the electromagnetic coil or coils, and while the main line current actuates the said plungers, a local current actuates the electromagnet coil or coils, or vice versa. Side bar magnets 58 and 59 as shown in Fig. 10 will greatly assist the magnetism attracting the armatures 60 and 61 (Fig. 10).

The current acts in the way above described in a two coil relay, and the poles are indicated by the letters $s$ and $s$, Fig. 10. This arrangement will exert a strong attractive force upon the small armatures 60 and 61, as they are placed near the center of the short gap formed in the magnetic field between the pole $n$ and said magnet side bars.

A simple wiring up method for an apparatus in which the main line current is lead in through the plunger coil, is represented in Fig. 11. The current is presumed to come in over L.1, contact pair 45, through plunger coil 46 to earth and back to zinc pole of the generating source of energy. The plunger will thereby be energized and simultaneously operate the permanent magnet bar 31, and the small armature 47, which latter will close a local circuit from battery 48, through the switching attachment's coil 49, from carbon pole over wire 50, armature 47, which at that moment will be in contact with stud 51, over wire 52, through coil 49, over wire 52', armature 53 (which will not be attracted, but will rest in normal position) and wire 54 to the said battery's zinc pole.

The shifting of armature 31 over to position $o$ (viz. to rest on stud $o$) will throw the insulating plate 63 (Fig. 11) into position between contact pair 45, and conducting plate 64 into position between the contact pair 65, which will open the path of the main line current through the plunger coil, but it will close another for it over contact pair 65, and out over the line by wire 69. If however the setting or locking out of stations is not meant for rapid operation, the said main line current will be led down from contact pair 65, to armature 55, over the line 66, over said armature 55, which will be attracted to stud 67 at the moment coil 49 is being energized, continuing its way over stud 67, wire 68, through coil 46 to ground. This method will keep armature 55 attracted just as long as the current impulses emanate uninterruptedly from the operating station, or during the contact period. This provides means for controlling the operation of the stations by retaining the current impulses at each station for the locking out and resetting purposes, preventing it from flowing out on the line until required.

At the instant the current impulse ceases to flow, (i. e. on releasing the key), the armature 55 at the operated station falls back on contact stud 70, so when the next impulse makes its path over that station, it will flow or follow the path opened for it over that armature, 55, post 70 and out over wire L¹ to the main line. In such controllable systems the connecting wire 69 is substituted for the wire 66.

For long distance work it is more a matter of moment to provide an apparatus sensitive enough to receive the long distance main line current, and such is provided as represented in Fig. 12 by two double wound magnet coils, 72 and 73. The windings of the coils, and the polarity induced in the magnet bars is the same as that for the devices shown Figs. 9 and 10. A side magnet bar 74 is provided in order to increase the magnetic attraction of the magnet coil poles upon the armatures 75 and 76. Said side bar 74 is energized with magnetism of S polarity when the base poles of the said magnet coils are induced with N polarity, or vice versa, according to the direction of the exciting current. As the gap in the magnetic field at the base of the magnet coils can be reduced or widened to suit the best purposes, this combinaton will make this apparatus very sensitive for weak or long distance currents.

A current impulse entering from L.1, will flow over contact pair 45 Fig. 12 into coil 73, from coil 73, to coil 72 and thence to the ground. The armatures 75 and 76 will be attracted instantaneously by said coils. This will close a local circuit through the plunger coil 77 from carbon pole of battery 78, over wire 79, armature 76, post 80, wire 81, contact pair 82, wire 83, armature 84, which is in normal position, over wire 85, through plunger coil 77, over wire 86, and back to zinc pole. The armatures 87 and 88 at the base of the plunger coil 77, will be attracted against posts 89 and 90. The circuit for the local current over the also attracted armature 75, post 100, wire 93, is broken off at contact pair 92 as long as the switching attachment is not shifted over to position o. This will energize the coil 77, but not the coil 94, for the local current from battery 78 is first prevented from flowing over contact pair 92, and when later on, after the multi-switching attachment's shifting, the circuit is closed over that contact pair, it is interrupted at the armature 87, which is kept attracted to post 69 as long as the main current keeps coils 72 and 73 energized, and armatures 75 and 76 attracted, and thereby the plunger 94 and its coil are kept entirely out of circuit and action. The local circuit over wire 81 and contact pair 82 will be broken off at that place (contact pair 82) when the shifting of the switching attachment into position o has taken place, but before that, another path over union 95 and wire 96, armature 87, post 89, wire 97, through coil 77 to zinc pole, has been closed.

The main line current from L.1 through the magnet coils will be cut off at contact pair 45 at the moment the shifting of the switching attachment takes place, but another path will be opened for it over contact pair 65 and armature 88 (which is also attracted, but against post 90, as long as the impulse lasts), as soon as that armature falls back in normal position, whereafter the current flows over wire 98 and again over L.1.

The instantaneously established connections over armatures 75, 76, 87 and 88 are broken off as soon as the impulse ceases to flow out from the operating station and through coils 72 and 73, (which it does during a very short interval that is provided for between each current impulse) so when the resetting of the apparatus is to be effected those instantaneous connections over said armatures have been broken off, and the armatures have fallen back from their contact points 89, 90, and 80 and 100. The conditions for the resetting current over L.2 are just the same as for the setting current over L.1, and the operation identically the same except that the setting impulse over L.1 is prevented from flowing out unrestrainedly again on the main line immediately after it has shifted over the switching attachment, by the described deviation through coils 72 and 73, wherewith the attraction of said small base armatures is sustained as long as the contact period lasts. While the resetting current flows out over the main line at the instant it has shifted the attachment back into normal position, n, there is generally no current deviation arrangement provided to detain it from flowing out after resetting a station, to a new station to be reset, and the resetting of even a large number of stations is thus accomplished in almost an instant.

The automatic impulsator and current distributing mechanism, with scaling interconnecting board is provided at each subscriber's station, and is represented in Fig. 3.

A motor M and a shaft with attached impulsators and current distributing disks and a stopping wheel are installed, whereby means are provided for sending direct or inverse current impulses into one or into several circuits in rapid succession. The impulsator and current distributing mechanism move with the motor and shaft in rotation and comprise in this system a burglar alarm impulsator, Fig. 6, a fire alarm impulsator, a burglar alarm testing impulsator, and a fire alarm testing impulsator, and furthermore a burglar scaling interconnecting board, and a fire scaling interconnecting board.

The mechanism of the apparatus is actuated by means of burglar or fire alarm contacts installed on the protected premises, and by means of a testing set controlled from the central station. When the mechanism is actuated by the said contacts, the automatic machinery that starts the current impulses, will produce burglar or fire alarm signals (either of them) at the patrolmen's posts and at central station, but when actuated by the testing set, it will produce first the protected premises' signal, by which it is known, and thereafter the signals by which the contacts, switches or the protected objects are identified, but such testing signals will only be received at the central station and not at the patrolman's post.

The burglar alarm impulsator and current distributing disks are provided with a number of contacts and a pair of contact brushes. The first single contact plate 101 on burglar impulsator disk 102, Fig. 6, will set the patrolman's or patrolmen's auxiliary apparatus Fig. 7. The two contact groups 103 and 104 on the same disk 102 will generate the burglar alarm signals there, while the other two contact groups 105 and 106 will produce the burglar signals at the central station which station has no auxiliary apparatus to be set first.

The single contact 101 of the burglar alarm impulsator disk 102 and contact groups 103, 104, 105 and 106 are connected with ring and brush contact 221 and by wire 222, union 223 and wire 150 to L.1.

The negative pole of the battery 191 is connected by wire 216, union 217, wire 218, contact pair 219, Fig. 2, and wire 220 to contact brush 109 of disk, 108 Fig. 6.

The contact groups 110, 111 and 112, (110 being a single contact) are connected with ring and contact (brush contact) 224 and by wire 227, contact pair 228 Fig. 3, wire 229 and at union 537 to earth, while contact groups 113 and 114 of the disk are connected with contact ring and brush 226 and by wire 225 to L.2.

The grouped contact plates on the said burglar alarm impulsator disks and also on the fire alarm impulsator disks, will repeatedly indicate the signal of the station, each station having its own proper signal code or combination. The contacts are arranged on each pair of disks (burglar alarm impulsator and fire alarm impulsator) so that the one is exactly opposite the other, so that such two opposite contacts may come in contact with their respective contact brushes simultaneously.

The fire-alarm impulsator and current distributing disks Fig. 6 are in the same way provided with a number of contacts, as described for the burglar alarm disks and as the location of the same is clear and exactly disposed as on the burglar alarm disks, the details referring thereto may be omitted.

In the same way as the burglar alarm does the fire alarm pair of disks give current impulses that produce signals at the patrolman's post and at the central station, and the one set of the contacts on disk 122 give the impulses and the other set having the same contact period on disk 123, convey them on their return travel to the zinc pole of their source of energy.

The burglar alarm testing impulsator and current distributing disk 129 is provided with testing contacts 192 and 193, single ones and in pairs, but it may also be provided with groups of three and four contact plates or more. This disk is not provided with corresponding contacts for the return current impulses, as are the burglar alarm and the fire alarm. The return current's path in this case is over the scaling board 147, over the scaling rod 141, and the detent armature 143 while released.

The fire alarm testing impulsator and current distributing disk 137 is in the same way provided with a row of testing contact plates, disposed similar to the burglar alarm testing impulsator disk contacts.

The burglar scaling interconnecting board is composed of an ascending sliding rod, two scaling contact boards, a ratchet wheel and a relay governing the releasing and attraction of a detent armature.

The sliding rod 141 ascends between the said scaling contact boards, 146 and 147, and the ascending movement is effected by means of a ratchet wheel 140 on the motor shaft. The ratchet wheel is provided with pawls 195 so arranged in connection with the detent armature 143 of relay 142, that an intermittent movement of said rod is attained. Said armature slides over the said rod's gradients, 197, as it ascends, and sustains it by means of said gradients between the lifting intervals. Said rod is further provided with two half moon shaped connecting pieces 144 and 145, between which is a spring that presses them lightly against the walls of the scaling boards. The scaling board 146 is divided into scales by insulating pads between each board or scale contact plate. Each scale is again divided into half scales in the middle of which a shallow cavity is provided, and a wire from each side connects with a burglar or a fire contact, or a sub-installation.

Those contact wires are, during the progress of the testing operation, extended into circuits that shunt the central station. The ascending rod's connecting piece 144 slips into said cavity during its upward movement whereby the small connecting rail of that contact piece, 144, forms a connection between the two contact wires. This contact rail is mounted on dielectric material, that keeps it insulated from the ascending rod.

The scaling board 147 is connected to L.2, by wire 669 and the conducting part of the ascending rod's connecting piece 145 forms connection with scaling board 147 under the testing operation, when armature 143 has fallen back, and with zinc pole of battery 194, over the rod 141, detent armature 143 and wire 148, while the carbon pole of the same battery 194 is brought in connection with L.1, over wires 200, 201, contact 436 (Fig. 6) wire 471, switch 401, wire 467, over scaling rod knob 144. Said knob is provided with a conducting plate and has at the operating moment been pushed up and forms a momentary continuous connection with wire 467, continuing up over wire 203, over wire 423, contact pair 422, wire 421, contact pair 420, Fig. 4, wire 420', over contact wheel 129, contact ring 665, wires 149, 150 and out over L.1.

In the burglar scaling interconnector pairs of wires are extended one from each half scale on the scaling board 146 to the burglar alarm contacts, one wire to each of the contacts at the connection 201 Fig. 6, and the other of the wires to each of the contacts at the connection 203 for testing purposes. The first testing is over these two connections, and after that each contact connection is tested separately.

Each contact's two lateral wires are designated in pairs in the representing design, for the sake of diminishing the numerals on that design.

The pair of contact connections is 466, Fig. 6, the first contact pair 467, the second contact pair is 468, the third contact pair is 469, and the fourth is 450.

The fire scaling interconnecting mechanism acts and works in every sense identical with the burglar scaling mechanism. However, in order to demonstrate the different combinations of the scaling interconnecting board that can be used, the board 151 (Fig. 3) is provided with contact springs 156 to which one of the contact wires is connected, and contact stud 155 to which the other contact wire is attached. The ascending rod's connecting piece 154 has no conducting part but is made up entirely of insulating material. The other contact piece 160 is fixed in the same way as the afore described contact 145 of burglar scaling interconnector, but the return line is in this case L.1, and the conductors leading to the zinc pole from union 196 at L.1, are wires 150, 157, scaling contact board 152, contact piece 160, rod 153, armature 158 of relay 161, wire 159 to zinc pole.

The testing processes of the installations are gone through one at a time, first the burglar alarm installation, then the fire protecting combination, and the respective ascending rods 141 burglar scaling impulsator and 153 fire testing impulsator will fall into their normal positions as soon as each of the installations has been tested and their coöperating apparatus (burglar alarm and fire alarm) reset.

In the fire scaling interconnector pairs of wires are extended in the same way from each spring contact and contact stud on the board 151. As will be noted, the contact arrangement on that board is a little different from the first one described for the reasons already stated. The wires reaching the contact scaling board 151 from the fire contacts are numbered in pairs, the first pair of contact wires is 452, the second 453, the third 454, and the fourth 694 and 695.

The scaling contact boards and the ascending rods need not be put up in vertical position, but may be as well placed in horizontal position and brought into normal position by spring force, instead of by gravity, as herein disclosed.

All the described apparatus and mechanism are represented in normal position.

Description of the apparatus at the central station.

At the central station there are provided a polarized relay 168, (as in Fig. 7), two distinct visual signals, and an audible signal.

One of the visual signals 170, (Fig. 7), coöperates with the burglar alarm mechanism at the subscriber's station, while the other coöperates with the fire alarm mechanism at the subscriber's station. The audible signal 172 is operated when either a fire or a burglar alarm is signaled.

The polarized relay includes the coils 186 and 187, which have two distinct windings, and the relay is provided with the usual pole pieces 174, which coöperate with the balanced armature 175.

The armature 175 (Fig. 7) is a balanced permanent magnet and is provided with lever contacts 176 and 177 which correspond to the burglar alarm installation, and the lever contacts 178 and 179 correspond to the fire alarm installation, they being all connected with the carbon pole of the local battery 180. The contacts 181 and 183 are connected to the audible signaling apparatus 172, through that to zinc pole by wires 230, 233, 231 and 232, and posts 182 and 184 are connected through the visual signaling apparatus 170 and 171 to zinc pole of battery 180 by wires 234 and 235.

One side of the magnet coils 186 and 187, (Fig. 8) at the central station is connected by wire 248, over pair of contact studs 308, pair 249 and pair 250 of keys 307, 306 and 305, contact stud 251 of key 304, over that key and wire 252, union 253 to L.1. The other side of same magnet coils 186 and 187 is connected by wire 255, connecting stud 256, key 301 and wire 264 to L.2.

The central station's relay alone is provided with a constant local battery 185 connected to one of the windings of the coils of relay 168, (Fig. 8), which is installed in order to counter-balance the constant current that flows in over L.1 and L.2 continuously from the connecting battery 189 at the extreme end of the line, and through coils 186 and 187. By means of the switch 188 the counter-balancing arrangement may be switched out every time signals are coming in, or the lines may be used for testing operations, telephone communication or for entertainment purposes.

A telephone connection is also provided for the central station communication with the subscribers, for the subscribers to call and communicate with same, and also for the subscribers to communicate with one another over the central station which acts as exchange station in that instance.

A number of keys and switches (Fig. 8) is furthermore provided at the central station, some of them being double acting, providing paths both for the outgoing and the return currents, over the same key and during the same depression or switch turning, but over wires insulated from one another, and other keys are common single key such as used for telegraph transmitting.

The positive pole of battery 258, (Fig. 8) is connected by wire 266, union 261, wire 262 to transmitting or battery contact 260 of key 301, and the negative pole of same battery, 258, is connected by wire 267, union 268 and wire 269 to return wire contact spring 263 of key 301, which is insulated from the key by a sheet of insulating material 283. Said key 301 is connected by wire 264 to L.2, and the return wire contact 265 to L.3.

The positive pole of battery 259 is connected by wire 270, over union 271 and wire 272 to contact stud of switch 302. The negative pole of same battery is connected by wire 274, union 275 and by wire 276 to contact screw 157 of same switch.

The switch 302 is connected by one of the switch arms 278 and wire 279 to line L.3, and by the other arm 280, wire 276 to zinc pole of battery 259. It is further connected by switch arm 278 and wire 711 to the telephone installation, and it is provided with a dip contact tongue 509 and a contact post 510. The post 510 is in connection with L.2 and the tongue, which in normal position is in contact with the contact post, is connected by wire 511 to contact post 512. Contact post 513 is connected to the earth wire. When the switch arm 280 is thrown over not farther than upon contact post 512 and the other switch arm 278 upon contact stud 273 the current is flowing out over L.3 and back over L.2, union 515, central station wire 514, contact post 510, dip contact 509, wire 511 to contact 512, over switch arm 280, wire 276, union 275, wire 274 to zinc pole of said battery 259. It should be observed that the circuit was over L.3 and L.2, the latter serving as return wire. When said switch arm 280 is thrown farther over upon contact 513, the switch arm 278 being on contact 273, which is made long so as not to allow the arm to slip over it on any of the throwings said switch arm 280 will press the dip contact (which is a spring contact) down, whereby it breaks contact with the post and therewith is the connection with L.2 broken off, but instead there is established connection with the earth over wire 277 and 282. The current flowing out over L.3, has in the meantime had its return L.2 substituted by an earth connection, at the subscriber's station, and the current will return through earth and at the central station ascend over connection 282, wire 277, contact 513, switch arm 280, wire 276 and back to zinc pole.

Battery 258 has its positive pole connected by wire 266, union 261, wire 262, union 284, wire 285 to contact 286 of key 303. The negative pole of same battery 258 is connected by wire 267, union 268, wire 269, union 287, wire 288, to return wire contact spring 289, which is insulated from key 303 by an insulating sheet 291. The key 303, is connected by wire 292 to L.2, and return wire contact of same key is connected by wire 293 to L.1.

The battery 258 has furthermore its positive pole connected over wire 266, union 261, wire 262, union 294, wire 295, battery contact 296 of key 304. The negative pole of same battery, 258, is connected by wire 267, union 268, wire 269, union 297, wire 298 to return wire contact spring 299, which is insulated from key 304 by an insulating sheet 310. The key 304 is connected by wire 252 and union 253 to L.1, and return wire contact 309 by wire 311 to L.3.

The battery 258 has also key connection by wire 266, union 261, wire 262, union 316 and wire 317 to contact 318 of key 305. The negative pole of same battery, 258, is connected by wire 267, union 268, wire 269, union 319 and wire 320 to return wire spring contact 321, which is insulated from the key 305 by a sheet of insulating material 322. The key 305 is connected by wire 324 to L.2 and the return wire contact 323 by wire 325 to L.1.

The positive pole of battery 258 has another connection by wire 266, union 261, wire 262, union 326 and wire 327 to battery contact 328 of key 306. The negative pole of same battery is connected by wire 267, union 268, wire 269, union 329 and wire 330 to return wire contact spring 331 of key 306. The key 306 is connected by wire 334 to L.1 and the return wire contact 333 by wire 335 to L.2.

The positive pole of battery 258 is again connected by wire 266, union 261, wire 262 to transmitting contact 336 of key 307. The negative pole of the battery is connected by wire 267, union 268, wire 269 to return wire contact spring 337 of key 307. The key 307 is connected by wire 340 to L.3, and the return wire contact 339 by wire 341 to L.1.

*Description of the burglar and fire alarm apparatus and mechanism at the subscribers' stations.*

Figure 1:
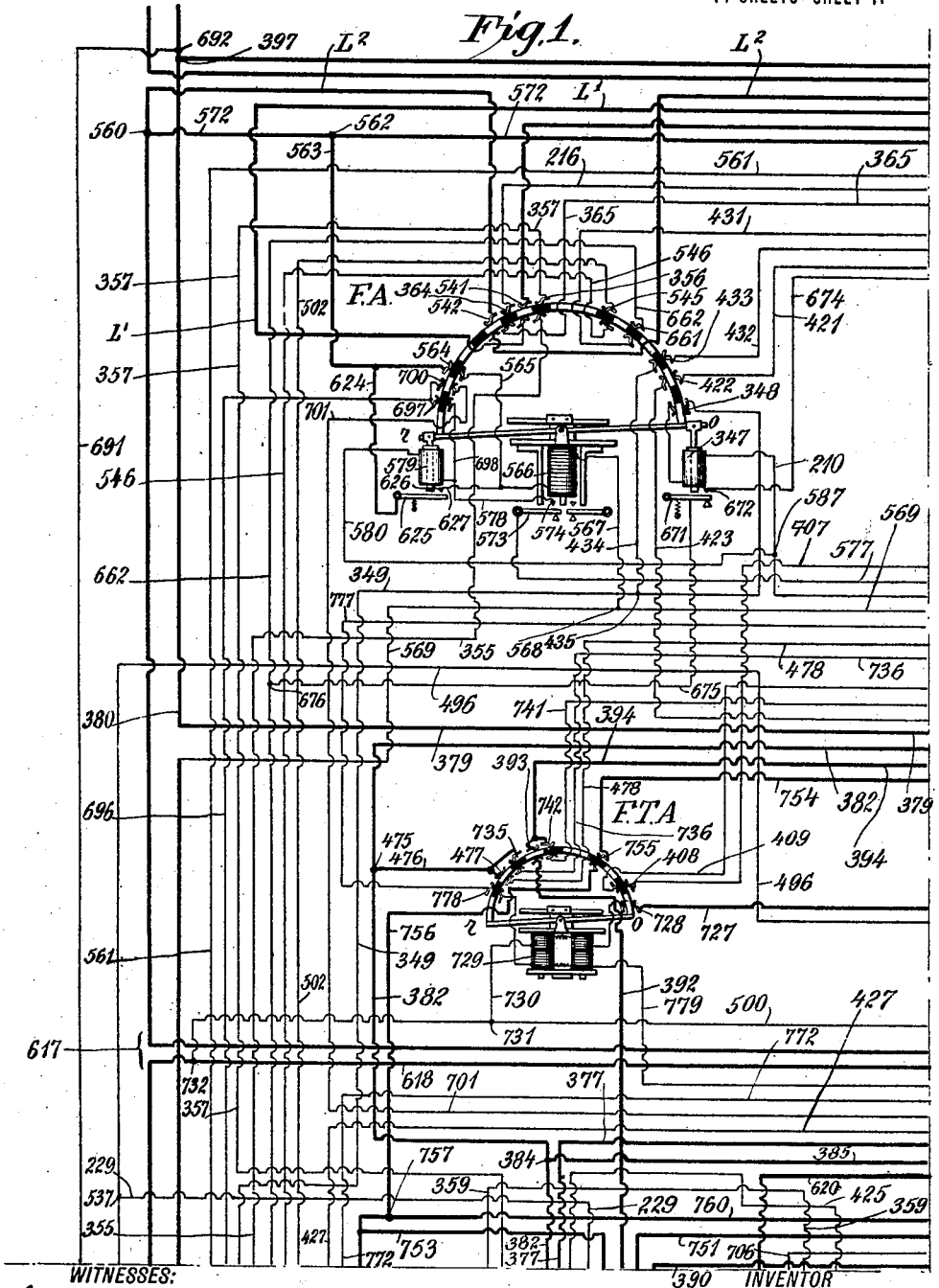
Figures 1 to 8 show parts of the system which combined give a diagrammatic showing of the central station, patrolman's station and a single subscriber's station.

Two sets of polarized multi-switching and magnet plunger apparatus are provided at each subscriber's station, and which for convenience of description, will be described as the fire and burglar alarm apparatus, (see Fig. 1). The fire alarm has a single wound electromagnet coil, and the burglar alarm has two double wound electromagnet coils.

The two other apparatus that coöperate with the burglar and fire alarm apparatus are the fire alarm impulsator and the burglar alarm impulsator as shown in Fig. 6.

The burglar alarm contacts 415, 416 and 417, (Fig. 6) each have one of their contact parts connected with the battery wire 201 and are provided with special switches 401, 402 and 403. Each switch is adapted to bridge the two contacts of each pair (415, 416, and 417) and thereby provide means for the switching of those contacts out or in at convenience, while the other contact parts of said contacts are connected with the wire 203, but details of the operation will be described hereinafter.

Single contacts are used for windows, doors, etc., and groups of contacts may be installed as it is otherwise found convenient.

The battery 194 has its positive pole connected by wires 200 and 201 to the connection of the burglar alarm contacts Fig. 6, and its negative pole to the opposite contact connection of same contacts by wire 211, from said pole over wires 210, 209, armature 208 of Fig. 2, wire 207, through magnet coil 206, over contact pair 205, wire 204 to said opposite connection 203.

The interior installation represented in Fig. 6 is composed of a relay 236, which is actuated by a local and constant battery 237, with the protected object 202 in circuit. The switch 238 switches the object into or out of protecting circuit. The same battery connections are made with the contact connections as before described. The positive pole of battery 194 is connected by wire 200 and wire 201, union 239 and wire 240 to switch contacts 241. The negative pole of same battery is connected by wires 211, union 346, wire 210, union 363, wire 209, armature 208 (Fig. 2), wire 207, through magnet coil 206, over contact pair 205, wires 204 and 203, union 242, wire 243 to armature contact 244, (Fig. 6). Switch 238 is connected by wire to the same armature. Armature 246 forms the positive connection when the switch throws the local current into circuit, for in that case the armature is attracted to contact post 247, so the opposite contact post 244 forms the negative connection.

In the fire alarm installation the battery 194 has its positive pole connected by wires 342, union 343 and wire 344 to the lateral connection 345 (Fig. 3) and the negative pole to the opposite lateral connection of same installation, over wire 211, union 346, wire 210, through magnet plunger 347, (Fig. 1) contact pair 348, wire 349, union 350, wire 351, switch 352, wire 353 to the other (the negative) lateral connection, 354 of the fire alarm contacts, (Fig. 3.)

*Description of the testing installation's apparatus of the subscribers' stations.*

The sets of polarized multi-switching and magnet plunger apparatus that are provided at each subscriber's station, are two, which I shall describe as the main testing apparatus, (Fig. 3) and the auxiliary testing apparatus, (Fig. 4.)

The fire testing impulsator, (Fig. 6) and the burglar testing impulsator, in connection with the fire scaling interconnecting board, and the burglar scaling interconnecting board, are furthermore provided at each subscriber's station.

Three relays are also installed at each subscriber's station, whereby means are provided to open and close circuits instantaneously in order to accomplish certain operations. Two of them, 372 and 373, (Fig. 5) have double wound coils, while the third, 387 has a single wound coil. They are energized from the central station over the circuit L.3 and L.2. The current from the central station enters at union 374, (Fig. 3), over wire 376, contacts 381, wire 382, union 475, (Fig. 1), wire 476, contacts 477, wire 478, contacts 479, (Fig. 2), wire 480, through relay coil 372, (Fig. 5), over wires 481 and 500 to union 732 to L.2 and back over that line.

As soon as coil 372 is energized the armature 483 and contact 484 close a local circuit from battery 485 over wire 486, armature 483, (which is attracted to post 484) over that and wire 487, through coil of relay 387, over wire 488, through a coil of relay 373, over wire 489 and back to zinc pole.

This local circuit energizes the two other relay coils 387 and 373, while the central station's current is flowing through relay coil 372. As it is necessary that those coils be energized a short while for subsequent operations, for which operations the line L.2 is needed, the return current flowing over it must be deviated. This is accomplished by a special switch combination at the central station which will later on be described. An instant after the L.3 and L.2 circuit is closed through coil 372, (Fig. 5), and the relay armature 383, is attracted against the post 491, the current will continue to flow in over L.3, wire 376, contact pair 381, (Fig. 3), wire 382, armature 383, (Fig. 5) which armature is attracted, to post 491, over that and wire 492, and when it arrives at union 493, it divides and flows over wires 492 and 494 in equal force through coils of both relays 372 and 373, as they are built with the same resistance. The two return wires from said two coils unite at union 495 and flow both over wire 496 to earth.

Line $L^2$ is now free and the relays are kept energized all the time and the deviation of the return current will not interrupt the continuous flow over the said three coils.

Contact pair 375 is connected on the one side to $L^3$ by wire 376, and on the other side with the armature 378 of intermittent relay 373, (Fig. 5), by wire 377, and when armature 378 is in normal position the connection extends over the same and by wire 379 to $L^3$ again, at union 380. This forms a through connection for the operating current when the main testing apparatus is thrown over in operated position. This is required whether the testing apparatus is set or not, and is provided for in both cases, as will be made clear in the following.

Contact pair 381 is connected on one side to L.3 over the aforesaid wire 376 (this wire and contact 381 are open for current passage when the main testing apparatus is in normal position), and on the other side by wire 382 to armature 383 of relay 372, (Fig. 5). A continuation of this connection is extended from wire 382 at union 384, wire 385 to armature 386, which is further extended when armature 386 is in normal position, over that armature, wire 388, over contact 389, wire 390, over contact 391, wire 392, contact 393, wire 394, key 395, wire 396 and joining $L^3$ again at union 397. This makes a through connection for $L^3$ from union 374 at $L^3$ to union 397, same line, when the station is not in use.

The wire 390 is brought down through the main testing apparatus in order to interrupt it and prevent connection with the main line over the telephone key, when the testing apparatus is set.

The other connections over that apparatus will more clearly be described under the operating methods of the installations, and the connections with the burglar and fire testing impulsators, and the scaling interconnecting boards will in like manner be fully specified in the following.

A diagrammatic view of the special switch installation of the burglar contacts is represented in Fig. 13. The object is to switch the protecting installation out of, or into operation at will as protection is wanted or not during the day time. Some may be switched out and others may remain in connection with the protecting contacts constantly, or for any length of time. The switches 401, 402, and 403, are provided each with a sliding bar, 460, 461 and 462, which slide over three contacts, and those sliding contacts or bars, are insulated from the switch arms. Provision is made to prevent the connection being broken over the lateral contact connection, which is made from wire 201, over the bars 460, 461 and 462 and over the wires connecting same, 439 and 459.

Assuming that contact 416 is switched off and the other two 415 and 417 remain in connection with the protecting contacts, and the current is coming in over wire 201, this will flow to contact 436, over conductor bar 460, contact 438, wire 439, contact 440, over sliding bar 461, contact 463, wire 459, contact 465, sliding bar 462, contact 464 and wire 466, which is insulated at the switching or the scaling board, 146.

If tests are made of all the contacts, the ascending rod 141 is gradually lifted up, and means are provided whereby the contact piece and plate 144 of the scaling interconnecting mechanism remain intermittently, or for a short while, in the cavities of the scaling contacts, whereby connection is made successively for all the pairs of wires from the burglar contacts long enough to send the signals of each contact down to the central station.

The first pair of wires to be tested are the contact connections and if those connections are in good condition, a signal will be received at the central station, by which it is known that nothing is wrong with them.

Assuming the scaling mechanism to be started and that the ascending rod had now reached the position that closes connection over the first contact wires, the current comes in over wire 201, contact 436, (as wire 466 is insulated at the scaling board, the current does not flow that way) but over contact 470, wire 471, connection 472, switch arm 401, contact 456, wire 467, and down to the connection made at the scaling board, producing the signals at the central station, which makes it understood that this contact is also in good condition, When the ascending rod has reached the cavity of the second wire pair and connects same over its connecting piece, then the current is this time coming in from wire 201, contact 436, 466 being still insulated at the scaling board, so it takes its path over sliding bar 460, contact 438, wire 439, but as the connection with contact 441 is broken off, the current is cut off both over wire 442 and 468. As the scaling board with the ascending rod is making no connection for any other pair of contact wires at that moment than for the one that is switched off (416), the signal at the central station will fail, which indicates that the second switch is not switched into connection for if that signal failed because the wire was broken off, the next following signals would almost in every case fail also.

This interruption of switch 402 or contact 416 does not interfere with the ascending rod, and that will within a moment reach the third pair of contact wires, and produce the corresponding signal, and all the circuits are tested in that way. The fire alarm contacts are represented in Fig. 3 as combining a group of contacts that is switched out or in simultaneously by switch 352, but each contact can as well have its proper switching method, as just described for the burglar alarm contacts.

*Description of the telephone apparatus of the subscribers' stations.*

Each subscriber's station is provided with two polarized multi-switching apparatus, (Figs. 1 and 2) and they may be installed with or without magnet plungers, according to the distance of transmission from the source of energy and the number of contacts attached.

A telephone apparatus, of the common type or of any generally used kind is also provided, as well as a magnet bell 404, with high resistance, a telegraph key 395, for calling up the central station, for which object a battery current bell at the central station may be used. A magneto generator 405 is also installed, but the latter is superfluous at the subscribers' stations, while the central station's means for calling the subscribers should be by a magneto generator, which is more efficient.

The bell 404 is connected through the switching attachment, (Fig. 1), over wire 407, contact 408 and wire 409 to earth over telephone arm 410 and 411. The other branch of this circuit is described in the heading Operating method of the telephone installation and locking out system.

The apparatus E (Fig. 2), is a very sensitive magnet telephone at the subscribers' stations for reproducing musical, lyric and theatrical or oratorial entertainments by means of magnified microphone apparatus, installed in places where such functions take place.

*The operating method of fire and burglar alarm installations.*

*The burglar alarm.*—Be it assumed that the switch 402 of the burglar alarm contacts 416, (Fig. 6) is moved to close the circuit. The instant this occurs the battery 194 will send out a current over wires 200, 201, switch contact 436, switch connecting bar 460, switch contact 438 of the switch contact 415, over connecting wire 439 to switch contact 440 of the switch 416, over the switch bar to contact 441, over wire 442 to switch connection 416, which is in contact with the opposite contact 416, and the current flowing through them to connection 203, over that and union 424, wire 204, contact 205, wires 443 and 482, through coil 206, over wire 207, armature 208, which is in normal position, wire 209, union 363, wire 210, union 346, wire 211 to zinc pole of battery 194.

The magnet coil 206, is energized and by drawing the plunger down into the coil it shifts the multi-switching attachment over in position o. This shifting closes a local circuit for the motor current from battery 198, over wire 502, contact 503, (which is closed since the said shifting of burglar alarm while contact 504 is opened) over wire 505, union 506 near M, wire 507 through motor M, (Fig. 6), over wire 508 to zinc pole of said battery.

This actuates the motor and as the signaling current circuit over the burglar alarm impulsator is also closed at the shifting of the apparatus, from battery 191, over wire 213, contact 214, wire 215, contact brush 107 of which comes successively in touch with the contacts on impulsator disk 102, converting the current into impulses, which flow as such over the wires leading to the contact ring and brush 221, wire 222, union 223, wire 150, union 196, to L¹.

As the single contact 101 on the burglar impulsator disk 102, and the contact groups 103 and 104 have the corresponding return current contacts 110, 111 and 112 on contact disk 108 connected to earth, and being arranged to have a simultaneous brush contact, and the same contact period, the current through the said contacts 101, 103 and 104, will flow to earth at the patrolmen's station, as there is earth connection both for the setting of the apparatus and for signaling purposes.

This circuit closes from battery 191 over wire 213, contact pair 670, wire 213, contact pair 214 (having that apparatus multi-switching attachment shifted over to position o) wire 215 contact brush 107 of burglar impulsator, contacts 101, 103 and 104, contact ring 221, wires 222, 150 and out over L¹, entering at the patrolmen's station over wire 519, contact pair 520, through coils 521, over wire 522 to earth, through ground conduction to earth wire 536, union 537, wire 229, contact pair 228, wire 227, ring contact 224, contacts 110, 111 and 112, contact brush 109, wire 220, contact pair 219, wire 218 union 217, wire 216 to zinc pole of battery 191.

This operation shifts the patrolmen's burglar alarm over to position o, opens the connection over contact pair 520, but closes it over contact pair 523, over which the signaling impulses are flowing, and over wire 524 through magnet coils 186 and 187 of relay 169, Fig. 7, and further over wire 525 to earth.

This relay (Fig. 7) is actuated by the current impulses emanating from contact groups 103 and 104 of the burglar alarm indicator, and will attract and release the permanent magnet bar 175, with contact levers 526 and 527 to one or the other side, according to the direction of the impulses, against contact posts 181 and 182, whereby two local circuits are closed from battery 180 and over lever 526, through contacts 176 and 177. The first circuit is closed over wire 230 through the bell 172, wire 231, union 529, wire 232 to zinc pole.

The next circuit is closed over the same lever and lever contact 177, post 182, through the lamp 170 over wire 234, union 529 and wire 232 to zinc pole.

The signals given are for each contact group three times the bell's ringing and three times the lighting of a lamp. The lamp indicates that the incident is a burglar's entrance, and the three times the bell rings indicates that the house or building being broken into is the one corresponding to the three short ringings.

The current impulses emanating from said contacts 105 and 106 will also flow over wire 529, (Fig. 7), armature 530, wire 531, over contact 534, wire 535 and out on L¹ again to the central station, entering at union 253 (Fig. 8) flowing over wire 252, key 304, wire 312, over contact pairs 250, 249 and 308, at keys 305, 306 and 307, over wire 243 through magnet coils 186 and 187 of polarized relay 168 further over wire 255, contact post 256 of key 301, over that key and wire 264 to contacts 558, and 557 wire 556, contact pair 555, wires 554 and 552 to L². Returning over that line it enters the operating subscriber's station at union 538, wire 225, contact ring and brush 226, burglar alarm impulsator over the wires connecting contact groups 113 and 114 on disk 108, and as they are carried around with the disk to contact brush 109 the current impulses flow over that, over wire 220, contact 219, wire 218, union 217, wire 216 to zinc pole of battery 191.

The signals received at the central station are similar to the described signals given at the patrolmen's burglar alarm, the apparatus and the associated signaling arrangements being substantially the same.

Referring again to the burglar signaling methods, the motor and the disks will move around and continue giving signals intermittently at the patrolmen's post and at the central station until due notice has been taken and the operator at the central station resets the mechanism at subscriber's and the patrolman's stations simultaneously with one depression of the resetting key.

*The fire alarm system.*—The mechanism of the fire alarm is operated in just the same way as the above described burglar mechanism; so it is thought unnecessary to repeat that in all its details.

The battery 194 furnishes the current over wire 342, union 343, wire 344 to connection 345, (Fig. 3) over the fire alarm contact that is closed, say contact 413, over that to the connection 354, from that over wire 353, switch 352, wire 351, union 350, wire 349, contact 348, (Fig. 1) through magnet coil 347, wire 210, union 346, wire 211 to zinc pole of battery 194. On the passage of current through coil 347, the plunger is drawn into the hollow core which shifts the fire alarm into position o, whereby the motor battery 198, comes into activity, sending current over wire 502, contact 545, wire 546, union 506, wire 507, through motor M, and back over wire 508 to zinc pole of said battery 198.

This puts the motor into operation. Battery 191 furnishes current over wire 355, over contact 356, wire 357, contact 358 (Fig. 3), wire 359 to contact brush 115 of disk 122, (Fig. 6), contacts 117, 118, 119, 120 and 121 of said disk, over ring and brush contact 360, wire 361, union 362, wire 225 to union 538 at L², over that line to the patrolmen's post, setting or shifting the patrolman's fire alarm apparatus (Fig. 7) by means of the current flowing in at union 546, contact 547, through pair of magnet coils 548. This sets said apparatus and at the moment that it is thrown into position o, the current's flow shifts and flows over contact 550, wire 551, through coils 186 and 187, (Fig. 7), and operates the magnet bar 175 and lever 527 in the same way as described for the burglar alarm signals, but the bar 175 and lever 527, are attracted to the opposite side of the burglar signaling device. The operating current passing through said magnet coils flows over wire 549 and 522 to earth and ascends over ground wire 536 at the subscriber's station, flowing over union 537, wire 229, contact 228, (Fig. 3), wire 227, union 371, wire 370, ring and brush contact 366, over connections to return current contacts 124, 125 and 126, contact brush 116, wire 365, contact 364 (Fig. 1), wire 216 to zinc pole of battery 191.

Continuing the course of said current impulses emanating from the subscriber's station, the course open for the impulses from the contact groups 120 and 121 of disk 122, is from the patrolmen's fire apparatus, over union 546, wire 552, armature 553, wire 554, contact 448, wire 449, to union 557 of $L^2$, over that line to central station, entering there at union 558, over wire 264 to key 301, over that key and post 256, wire 255, magnet coils 186 and 187, actuating the bar 175 and delivering the signals at the central station in the same way as described for the signals given at the patrolmen's burglar alarm, which is a bell's ringing and the lighting of a lamp, but in the case of signaling a fire alarm signal a red lamp is lighted, and that distinguishes it from the burglar signal, which is a blue light. The bell or buzzer sounds the signal of the station that originates the signals.

The circuit actuating the patrolmen's station is $L^2$ and earth, and the circuit actuating the central station signaling apparatus is $L^2$ and $L^1$, so the last current impulses return over that line, entering the subscriber's station at union 196, flowing over wire 150, union 368, wire 367, ring and brush contact 369, over wires connecting contact groups 127 and 128 of disk 123, fire alarm impulsator (Fig. 6) over said contacts when under the contact brush 116, over that and wire 365 and over the path previously described for the burglar return current, and back to zinc pole of battery 191.

Resetting of both burglar and fire alarm signaling mechanism may be described together. For resetting this apparatus the operator at the central station depresses the key 301, (Fig. 8), and a current flows out from transmitting or battery contact 260, over key 301, wire 264, union 558 at $L^2$, over that line to the patrolmen's station, (Fig. 7), over union 591, wire 592, over contact 593, (which is closed) over wire 594, over union 595, wire 596, through resetting relay 597, wire 598, union 599 and back over $L^3$ entering the central station at union 570 over wire 571, return wire contact 265 and return wire contact spring 263, which are in contact together, over wire 269, union 268 and wire 267 to zinc pole of battery 258.

It will be seen that the current could not have taken the way further over $L^2$ and over contact 600 as that apparatus would not be set in a fire alarm case, and the contact 600 would consequently not be open for current passage. However, if it had been the patrolmen's burglar alarm that had been actuated instead of the patrolmen's fire alarm, the current would come in over $L^2$ contact 600, over wire 601, union 595, (contact 593 is in this case closed) over wire 596, through resetting coil 597, over wire 598, union 599 and back over $L^3$ to central station to zinc pole of battery 258 and over the just described return path.

As the current passed relay 597 it energized said relay and the armature 602 is attracted, and this closes a local circuit from battery 180, wire 613, armature 602, post 603, wire 604 to contact 607. The current flows over short wire 608, contact 609, over wire 610 to contact 611, over wire 612, through second winding of pair of magnet coils 548, (in an inverse direction of the setting current), and back over wire 614 to zinc pole of battery 180. This shifts the switching attachment of the patrolmen's fire alarm into normal position.

Continuing the case of resetting the patrolmen's burglar alarm (Fig. 7) the local current, as it reached contact 607, goes through there, as that would be open for current passage, while contact 609 would be closed. It would further flow over wire 615, through pair of magnet coils 521, through second winding in inverse direction of the setting current, energizing that apparatus and thereby throwing the switching attachment into normal position, and it would thereafter flow over wire 616 and back to zinc pole of battery 180.

After having reset the apparatus at the patrolmen's station the resetting current will flow farther out over 557, 556, contact pair 555 wires 554, 552 to $L^2$ to the subscriber's station where one of the burglar alarm or fire alarm apparatus is open for that current, (circuit $L^2$ and $L^3$) so it will find its course over union 560, wire 572, and if it has been the fire alarm, that has been set, the current will flow over wire 572, union 562, wire 563 and contact 564, over wire 565, through magnet coil 566, wire 567, union 568, wire 569 to $L^3$ and back over that to central station entering at union 570, (Fig. 8), over wire 571 to return wire contact 265 of key 301, and as that key's return wire contact spring 263 at that moment is in touch with contact 265, the current flows back over wire 269, union 268, wire 267 to zinc pole of the operating battery 258.

As the current flows through magnet coil 566 of fire apparatus it attracts the armature 573, whereby a local circuit is closed, the current emanating from battery 194, flowing over wire 200, union 576, wire 577 to armature 573, which is attracted and in contact with post 574, so it flows farther over that post, wire 578, branch 900, energizing solenoid 579. This operation draws the plunger into the magnet core and shifts the switching attachment over in normal position.

Assuming that it had been the burglar alarm apparatus, that had been set then the central station current would take another course, *i. e.*, from L² over union 560, wire 572, contact 573, wire 574, through magnet coil 575, over wire 569 to L³ and back to central station the same described way as from the fire alarm apparatus.

When this central station resetting current flows through magnet coil 575, it energizes that coil, and the armature 582 is attracted, whereby a local circuit is closed. This current flowing from battery 194, over wire 200, union 576, wire 577, union 583, wire 584, over armature 582, which is attracted against post 585, over wires 586 and 587, through magnet coil 588, over wire 589, armature 590, which is in normal position, over wire 210, union 346, wire 211, and back to zinc pole of battery 194. This circuit, in closing through said magnet coil, shifts the burglar alarm apparatus into normal position.

In order to avoid the burglar alarm and fire alarm resetting current from flowing farther out over the line when it has reset the actuated apparatus in a station and thereby preventing the line connecting to stations farther out being interfered with, means have been provided whereby that is prevented. When the fire alarm or burglar alarm has been reset, the contact period cannot be measured to fit the duration of the instant it takes to throw the fire alarm over to normal position, so for the rest of the contact period's duration (which is the time the key is depressed at the central station), a shunt is provided from wire 563, (when contact pair 564 is opened) over wire 624, armature 625, post 626, that armature being attracted wire 627 and through magnet coil 566. This will keep armature 573 attracted and therewith the magnet coil 579 energized by that local current in the same way.

It may be explained that it is only a part of the central station current (although the greater part) that is available for the energization of the resetting relay 597 of the patrolmen's station (Fig. 7), as one part will flow out on L², and that is the reason why it is necessary to take advantage of this more sensitive relay system instead of operating the patrolmen's fire alarm or burglar alarm directly. That part of the current flowing out, having L³ and L² as its circuit, does absolutely no harm anywhere on the line.

*The operating method of the testing and the locking out installation.*

Operating the tests, the operator at the central station opens his way through all the stations, and he can either test them one by one successively as he proceeds; or he can select any station he wants to test, which last he may have to do when he may have noticed that several stations had not yet been switched into connection.

The operator throws over the switch 302 (Fig. 8), so that the switch arm 278 rests upon contact 273, while switch arm 280 with attached contact plates rests upon contact 512.

When the switch arms rest on studs 273 and 512, a current from battery 259 flows out over wire 270, union 271, wire 272, contact stud 273, switch arm 278, wire 279, over L³ to the first subscriber's station, flowing in there at union 374, over wire 376, contact 381, (Fig. 3), wire 382, union 475, wire 476, contact 477, wire 478, contact 479, over wire 480, through coil of intermittent relay 372, over wires 481 and 500 to union 732 at L², and back over same to central station, where it flows in at union 515, over post 510, dip contact 509, wire 511, switch arm 280, wire 276, union 275 and wire 274 to zinc pole of battery 259.

The switch 302 and arm 280 is thereafter thrown over upon contact 513, shifting the return current over through earth and will be kept in that position a while until the coil of the intermittent relay 387, (Fig. 5) at the subscribers' stations is also energized by the local current as previously described.

The key 303 at the central station (Fig. 8) is now depressed and a current from battery 258 flows from battery contact 286, over said key, wire 292 over L² to patrolman's station as previously described, thence over that to first subscriber's station, flowing in at gap 617 of L², over wire 618 to armature 619 (Fig. 5), which is attracted to the post of relay 373 which is connected with wire 620, over that wire to contact 621, through coil 398, over wire 622, to L¹ through patrolman's station and back over that line to central station flowing in at union 623, over wire 293, return wire contact 290, which at that moment is in contact with return wire spring contact 289, over that and wire 288 to zinc pole of battery 258.

The passage of this current through the magnet coil 398, energizes it, and at the same time that it exerts attraction upon the plunger, it attracts the armature 630 against post 631, whereby a local circuit is closed from battery 194, over wire 342, wire 633, armature 630, post 631, wire 632, through magnet coil 634, wire 635 and 585 to zinc pole of battery 194. This local current exerts a magnetic force upon the armature of the main testing apparatus that helped to throw it into position *o*.

As soon as the switching attachment of the main testing apparatus has shifted over to *o*, the contact 621 is open but contact 636 is closed and the current then flows over that, over wire 637, armature 638, which is attracted to post 639, over that armature and post, over wire 640 and through plunger coil 398, over wire 622 to L¹, and back as above described. This passage of current keeps the said armatures 630 and 638 attracted, and it keeps the current flowing over the deviated way as explained, as long as the contact period lasts, so that no current flows over the line untimely.

This operation shifts the switching attachment of the main testing apparatus over to position o, and the next current impulse sent out by the central station operator from switch 302 flows through this first set station's apparatus over union 374 of L³, wire 376, contact 375, (which contact is now closed while contact 381 is open), over wire 377, armature 378 of relay 373, (Fig. 5), wire 379, to wire 380, to union 397 and farther over 396 to next station, setting all the following stations' main testing apparatus in the same way.

When the station is reached that has to be tested, the intermittent relays are kept energized through the switch 302, and are not to be released until the second depression of key 303 has been effected at the central station, as above explained at the first operation. As afore described, the depression of key 303 sets, or shifts, the switching attachment, over to position o, and when further signaling operations have to be done, the key 303 at the central station is released for an instant, giving the armature 638 time to fall back on its resting stud, so that with the opening of contact 636, and with the armature 638, resting on the stud that is connected to wire 561, the current comes at this second depression flowing from central station over the just described way for the shifting of the main testing apparatus, but instead of going through the coil 398, it flows over the armature 638, wire 561, through magnet coil 641, over wire 642 to union 643 into L¹, over that line to central station where it returns at union 623 and the same way to the zinc pole of battery 258 as above described.

Passing through magnet coil 641 of burglar alarm apparatus, the current not alone exerts attraction upon the switching attachment's armature, (the permanent magnet bar) but it also attracts armature 644 against post 645, which last action closes a local circuit from battery 194, over wire 200, union 576, wire 577, union and wire 646, armature 644, post 645, over wire 482, through coil 206, over wire 207, armature 208, wire 209, union 363, wire 210, union 346, wire 211 and back to zinc pole. This operation accomplishes the shifting of said attachment.

The motor is now actuated in just the same way as before described. The motor M and the disks are rotated and the first impulsator to act is the burglar impulsator disk 102, sending the stations' signals repeatedly down to the central station as many times as there are contacts or contact groups on one rotation designed for the central station signaling. The patrolmen's station is unaffected, the connections to that post installation being cut off at contact 228, when the testing process is performed because the signaling there would mislead the patrolman.

The first rotation of the impulsators is for the purpose of repeating the signal of the station that has been set, so as to ascertain whether the operator has got the right station in action.

At the setting of the main testing apparatus, the return wire from the earth to the disks of the burglar or fire alarm impulsator is cut off at contact 228, as will be seen by retracing the return current's connection from contact and contact groups 110, 111 and 112 on disk 108, and contact groups 124, 125 and 126 on disk 123, up to that point; and that cuts the signaling at the patrolmen's post off.

The setting of main testing apparatus opens a connection from battery 194, wire 200, contact 428, wire 427, contact 426, (which is now open for current passage) wire 425, to contact brush 135 of the burglar testing impulsator, and the disks 129 and 131 are now entered into activity.

A moment before the disk 131 finishes its first rotation and before the transmitting of the contact signals commences, the contact 132 comes under the contact brush 135 which sends a current impulse over the wire connecting it, with the ring and brush contact 652, over wire 653, contact 654, through a pair of magnet coils 655, over wires 656 and 211 to zinc pole of battery 194. This operation sets the auxiliary testing apparatus in the usual way.

When the burglar alarm and the auxiliary testing apparatus are in normal position the local connection through that relay's coil 142 is interrupted, but as soon as the burglar alarm is set the local circuit is closed through that coil and the said armature is attracted, i. e., it is kept inactive in order not to have it interfere with the burglar signaling system, when that has been actuated by burglars tampering. But when, in cases of tests, the auxiliary testing apparatus is set after the first rotation of the disks, this local circuit is broken off, and said armature becomes active in its released state. Just before finishing the second rotation immediately after the burglar alarm is reset, and the fire alarm is set in that same instant, a circuit is closed an instant over both relay 142, burglar scaling interconnector and relay 161 fire scaling interconnector, attracting both those relays' armatures 143 and 158, wherewith the scaling rod 141 falls, or both rods would fall if the two had climbed the scaling boards.

When the burglar alarm is set, the circuit is closed from battery 485 over wire 486, union 433, contact 682 by auxiliary testing apparatus, wire 431, union 430 wire 429, contact 658 of burglar alarm apparatus, wires 659 and 680, through relay 142, wires 660, 489 and back to zinc pole of battery 485. This attracts detent 143. When the auxiliary testing apparatus is set that same circuit is interrupted at contact 682 of auxiliary testing apparatus. Also when both are in normal position this local connection is interrupted, so the said armature, 143, is released under normal conditions in order to save waste of batteries, but it is held up and released in time to avoid interference in other operations, and in time to serve its objects. The connections are the following: from battery 485 over wire 486, union and wire 433, contact 682, wire 431, union 430 and wire 429, contact 658, wires 659 and 680, through coil of relay 142, over wire 660 and back to zinc pole of said battery. The combination that releases both of said armatures, 143, and 158, which serve as detents, will be described further.

It has already been stated that the connection formed by the sliding connecting bars 460, 461 and 462, (Fig. 6) and connecting wires 439 and 459 are connected with carbon pole of battery 194, over wire 200, union 257, wire 201 to said connection, and this switch connection is further connected by one wire of the pair 466 to the half of one of the scaling board contacts, while the other wire of the pair is connected to the other half part of that same scaling board contact, and up to the other connection 203. When now under the test the contact piece 144, of the ascending rod, covers the cavity of the scaling board contact and makes connection for the pair of wires 466, the following connection, or circuit, is established: from battery 194, over the connection, over the first scale connecting wire, over contact piece 144, over the second wire of pair 466, up over the connection 203, farther over union 424, wire 423, contact 422, wire 421, contact 420 (which is closed since this attachment was set) wire 420', brush contact 130 burglar testing impulsator, over the contacts 192, 193 and all of them successively on disk 129 as they come under the brush contact, over ring contact 665, wire 149 and 150 to $L^1$ at union 196, over said $L^1$ to central station, union 253, (Fig. 9), wire 252, key 304, wire 312, contact pairs 250, 249, and 308, wire 248, through the signaling apparatus (Fig. 8), over wire 255, key 301, wire 264 to $L^2$, over that line to the subscriber's station that is under the testing process, flowing in at union 538, wire 225, union 668, wire 669 to scaling contact board 147, (board 147 is a contact bar,) farther over ascending rod's contact piece 145, over the rod 141, which is also of a conductive material, and over armature to zinc pole of battery 194.

The fact that the signals come in to the central station is evidence that the connections, wires and the burglar mechanism is in order.

The next pair of wires, 467, leads from the contact parts of contact 415, and connects each of those parts with one of the half parts of the scale contacts of the scaling board 146. Such scale contacts are divided into halves and insulated from one another. As the ascending rod with its connecting piece 144 is pushed up to the second cavity on the scaling board in which it rests an instant, and forms connection between those halves, the first wire of 467, which is connected with that part of contact 415 to which the battery 194 is connected over wires 200 and 201, forms a circuit from that battery connection at 415, first wire of pair 467, the first part of the scale contact, over the ascending rods connecting piece 144, over the other part of that scale contact, over the second wire of wire pair 467, wire 203, which connects the second contact part of contact 415 and farther over union 424, wire 423, and over the same course as above described.

If the signals come in at the central station the contacts and the switches' positions are all right. The signals may be arranged on the impulsator disk so as to give one, two, three or four short sounds, for, successively, the first, the second, the third and fourth contact, whereafter it commences again with the same number of sounds, so as not to make the signals too long for the space that can be disposed of, and by those sounds, when checked with a list of each subscriber's number of contacts and sub-installations, it will soon be found out which contacts have failed to sound, so the subscribers can be advised by the phone, or steps taken to watch the place by frequent testings.

The distance between the contacts on the signaling impulsator will have to be made to fit the climbing steps of the ascending rod, so that the contact piece of that rod rests long enough for each contact or group of contact signals to be given.

As before described only one pair of wires are in connection at the time over the said scale contacts when the tests are taken, while the other wires over the scaling boards are cut off there, so the current can flow only over that particular wire pair that is connected over said board.

The connection for the contact 415, (Fig. 6) is over sliding bar contact 436, (Fig. 13), contact 470, wire 471, contact connection 472, contact arm 401, wire 467 and over the described way. Suppose now that contact 416 is switched off, that will not break the connection off for other contacts connected on the same series of contacts, but as the current cannot flow over from contact 440 to contact 441, and over the way already pointed out, no signal will be given at the central station for the contact 416.

The fire installation's tests are performed very much in the same way. It will be remembered that the first rotation of the motor and disks produced the signals of the station, but just before that was finished the auxiliary testing apparatus was set, and that cut the current supply wires 215 and 213 off for the burglar alarm impulsator at contact 670, so that could not send any more impulses as long as the auxiliary testing apparatus was set. It should be noticed that this auxiliary apparatus was not set until after the contacts 133 and 134 of disk 129 had passed their respective brush contact 130, so they do not produce any effect until they come around again, which is an instant before the second rotation is finished.

The second rotation gave the testing signals and at the end of that rotation the contact plates 133 and 134 of disk 129, come into activity, being carried under the current supplying contact brush 130, and the first current impulse is sent from plate contact 134 over ring contact 650, wire 651, wire 349, through contact 348, through coil 347, wire 210, union 346, wire 211 and back to zinc pole. The passage of this current through coil 347 sets fire alarm apparatus.

The next current impulse coming from contact plate 133, flows over ring contact 657, through coil 588, (before passing plunger coil 588 the current flows over wire 587). Resetting in this usual way the burglar alarm apparatus current flows over wire 589, armature 590, wire 210, union 346 and wire 211 back to zinc pole. Going back to the ending of the first rotation of the disks the contact 132 on disk 131 had set the auxiliary testing apparatus, whereby the local circuit controlling the attraction and releasing of armatures 143 and 158 of relays 142 and 161 is broken off at contact 682, which makes those armatures fall back and serve as detents for the ascending rods. After that and when the second rotation of the disks is nearly accomplished and at the moment contact 134 on the disk 129 sets fire alarm apparatus, the setting current, energizes coil 347, attracts armature 671 to post 672 of that magnet. This act closes a local circuit from battery 485, over wire 486, union 673, wire 674, post 672, armature 671, wire 675, union 676, wire 662 to union 677, where it is divided, one part going up over wire 678, through relay coil 161 and over wire 663 to zinc pole, and the other part over wires 679 and 680, through relay coil 142, over wire 681 to zinc pole. This attracted simultaneously both armatures 143 and 158, and both the ascending rods 141 and 153 fall into normal position. The armature 158 and rod 143 are now in position to commence the testing process of the fire alarm installation.

When the ascending rod comes up and presses the scaling board contact spring 156 against post 155, a circuit is closed from battery 194, over wire 342, union 343, wire 344, lateral contact 345, one of the wires of pair 451 connected with spring contact 156, and as that makes contact with post 155, by pressure of contact piece 354, the current flows over said connecting contacts, 155 and 156, and over the other wire of pair 451, over connection 354, wire 353, switch 352, wire 351, union 350, wire 349, union 435, contact 433, (which is in closed position at that moment for passage of current) wire 432, contacts 683, wire 430 to contact brush of fire testing impulsator.

The contacts on disk 137, will successively come under the contact brush 138 and will send current impulses over the wires connecting ring contact 684, wire 685, union 686, wire 225 to contact 538 at $L^2$, over that line and through patrolmen's station, passing union 546, over wire 552, armature 553, wire 554, contact 555, wire 556, to union 557, at $L^2$ over that to union 558 at central station, wire 264, key 301, contact 256, wire 255, through polarized relay, giving the testing signals and flowing thereafter further over wire 248, contact pairs 308, 249 and 250 of keys 307, 306 and 305, over key 304, wire 252, union 253 and out over $L^1$ and back to subscriber's station, entering at union 196, flowing over wires 150 and 157, scaling board 152, ascending rod 153, armature 158, wire 159 to zinc pole of battery 194.

The other contact tests will now be understood, as they are effected in the same way as the burglar alarm contacts, but without the special switching attachment. The fire alarm signals are switched off in a group as shown, but each or several of them may have proper switches in the same way as in the burglar alarm installation.

In order that the wires may be tested wire by wire or piece by piece in an installation and from the distant central station, $L^3$ is subjected to such a testing control from its entrance into a subscriber's station and to its outlet. A special battery is installed for that purpose, but the same battery as is applied for the other contact tests can be used without interfering in any way with the function of any of the other installations.

When the ascending rod 151 presses the spring contact against the post at the uppermost scaling contact, a current will flow from battery 690, wire 691 to union 692, wires 380, 379, switch 378, wires 377, 376, and over $L^3$ to union 693 at the entrance, (the lower entrance) of that line, over wire 694 into the scaling contact and out over wire 695 to union 350, from there over wire 349, union 435, contact 433, and the same way down and over disk 137, out over $L^2$ and back over $L^1$, over union 196 at $L^1$, wire 150, scaling board 152 to zinc pole of battery 690.

The auxiliary wires leading to said contact parts of the said uppermost scaling contact arrangement, 694 and 695, are insulated there at all other times except just when the test is effected, and the connections and circuit formations are of such a nature that a burglar or a fire alarm signal would immediately be noticed at the central station, just in the same way as any other test signal entering the central station, simultaneously with the burglar or fire alarm signals would be observed, and the testing process will consequently be suspended.

A burglar or a fire alarm signal set off while the central station is receiving test signals, will be noticed in the same way as when one telegraph operator interrupts the other on a telegraph line. The test and the burglar and fire alarm signals are sent from two different batteries, which will send both currents strongly and in an irregular way through the central station, and the noisy effect cannot escape notice. Testing currents can not reset any of the burglar or fire alarm mechanism as the circuits are different ones.

Every piece of wire of an important installation can by such means be tested at long distances.

The resetting of the apparatus set by the disks at the subscribers' stations may be effected in such a way that the main testing apparatus can remain in set position, as it will often be necessary to have it stay that way until a number of tests, or a whole series of tests through all the stations has been accomplished, so means are provided whereby the resetting of the fire apparatus and auxiliary testing apparatus is accomplished by the contact disk 137. The last contact 139 on the back side of that disk sends a current impulse out when it comes up under contact brush 138, over the wire connecting it with ring contact 695, over wire 696, contact 697, which is closed, over wire 698, through coil 579, over wire 580, union 587, wire 210, union 346, wire 211 and back to zinc pole.

This operation energizes said plunger coil and shifts the fire apparatus over into normal position, but as this shifting is only an instant's work, the passage of the current over contact 697, is cut off there, but a path for it was opened over contact 700 by the same oscillatory movement, over wire 701, contact 702, through pair of magnet coils 655, over wire 703, union 704 and wire 211 to zinc pole of battery 194.

It would not be convenient to have the motor stop just at the moment these apparatus were reset, so means are provided whereby the motor will continue to run until it reaches its stopping place on the insulated part 167, in order not to leave any current openings to the lines.

Following the wire 502, from the motor battery's carbon pole, when both the burglar and fire alarm apparatus are reset, the contact 504 of burglar alarm opens a passage for it over wire 706 to brush contact 163, which slides on contact rail 164, keeping the connection up for the motor current, over ring contact 165, wire 507, through the motor and back to zinc pole. When the brush contact slides from that rail contact over upon the insulating pad 167, the current is broken off, and the mechanism stops automatically with all the contact brushes on insulating pads. This stopping device may be equally as well arranged for the burglar alarm and fire alarm resettings, as for the stopping after the testing operation.

It should be noted that the detent armatures 143 and 158 remain inactive all the time a burglar or fire alarm acts, as the current supply wires 420, 425 and 430, connected to brush contacts 130 and 135 of burglar testing apparatus and 138 of fire testing apparatus are interrupted in the automatic testing apparatus and main testing apparatus, as long as they are not set, and as the burglar or fire alarm mechanism, when actuated by burglars or fire do not set them, the disks will continue rotating and repeating the signals as long as they are not stopped by the resetting device from the central station, so in this case nothing will bring those detent armatures or ascending rods in activity regardless of how often the burglar and fire alarm mechanisms may operate.

*Operating methods of the telephone installation and locking out system.*

When a subscriber wants to communicate with the central station he presses the telegraph key 395 (Fig. 5) and keeps that depressed all the time he speaks with the central station and also when he calls. Either magneto or battery calling can be installed, but battery calling means may be more convenient for the subscribers to the central station. For calling the central station both the key 395 and the button 707 are depressed, the button only intermittently. The calling current comes from battery 194, over wire 200, union 576, wire 577, union 708, over button 707, (when depressed), over key 395, wire 394, contact 393, wire 392, contact 391, wire 390, contact 389, wire 388, over armature 386, wire 385, union 384, wire 382, contact 381, wire 376, union 374 and over L³ to union 710, (Fig. 8), wire 279, switch arm 278, wire 711 to telephone contact 712, through the bell and over wire 713 to earth connection 282, back through ground and ascending at the subscriber's station over earth connection 714, union 715, wire 716, union 717, over wire 210, union 346, and wire 211 back to zinc pole of battery 194.

The talking circuit, when the telephone receiver is unhooked and the telephone arm thrown up against connecting contacts 718 and 854, starts from battery 850, flows over microphone 851, the primary coil 852, wire 853, telephone arm 410, contact 854, wire 855 and back to its battery zinc pole. The secondary induction coil 856 transmits the induced current waves over wire 853, telephone arm 410, contact 718, wire 739, union 719, wire 720, contact post 721, key 395 (which is in touch with said contact post when a subscriber is talking) to the central station. The first telephone apparatus is set for communication over wire 394, and the same way down to central station, over the telephone there, and back again through earth, as just described for the calling circuit, except that the return induction current after ascending over wire 714 flows over union 857, wire 858, telephone receiver 859, wire 860, and that circuit is closed at the said secondary induction coil's other end.

When the central station wants to communicate with some party on the line, the operator at the central station sets all the main testing apparatus in just the same way as described for the operation of the testing installation, but having operated his way through station after station out to the selected station, which in the telephone setting case does not have its main testing apparatus set, as is the practice when tests are being made the operator leaves the apparatus in Fig. 3 unset, (in normal position) and when he has energized the intermittent relays as described heretofore, he depresses his key 306, (Fig. 8), sending a current out from battery 258, over the battery contact 328, key 306, wire 334 to L¹, over that to patrolmen's station, over the described course through that station, union and wire 533, contacts 532, wire 531, armature 530, wire 529, union 518, out over L¹ to the gap 723 of that line at the subscriber's station that is to be set for telephone communication to armature 725 of relay 387, and as this is attracted the current flows over post 726, wire 727, contact 728, pair of magnet coils 729, wire 730, union 731, wire 500 to union 732 of L², and back over that line, over the patrolmen's station and to central station, over return wire contact 333 there, key 306, over return wire spring contact 331, which is in touch with return wire contact 333, over wire 330 to union 329, over wire 269 to union 268, wire 267 to zinc pole of battery 258.

As the current passed magnet coils 729, the switching attachment shifted over in position o and the line is therewith opened for central station to the subscriber's telephone. The calling is by magneto 734, its circuit being L³ and over wire 713 to earth. The line connection is over wire 712, switch 302, wire 279 to L³, over that to the subscriber's station at union 374, over wire 376, contact 381 (the main testing apparatus is not set at the selected station) over wire 382, wire 476, over contact 735, wire 736 to telephone contact 718, over bell 404, wire 407, contact 408, wire 409, over telephone arm and to earth. In this case it is not necessary for the subscriber to depress the key 395 when talking, for the central station comes into the telephone connection over a different wire from the apparatus.

Thus it is seen that the subscribers can connect themselves with the central station which they can do directly and rapidly. Also that the central station can select any subscriber on the line, call him up and converse with him without anyone on the whole line being able to hear the calling, the talking or to disturb them, as the setting of the main testing apparatus in all the intermediary stations locked the intermediary subscribers' instruments out of connection with the line until the line is reopened by resetting all the set apparatus.

The entertainment installation may be abolished or it may be connected with the telephone installation by appropriate switches to cut it off from the latter.

Suppose now, in going farther, that a subscriber should ask the central station to put him in communication with another party, then the central station operator will set the first station, that one of the two stations to be set, which is the nearest to the central station, be it the demanded or the demanding station, the connection being made in the same way as the one just described; but before the three intermittent relays are released, after the first telephone apparatus has been set for communication in the station nearest the central station another operation is required, so while still keeping the said relays energized the operator depresses the key 307, whereby he closes a circuit over L³ and L¹, from battery 258, over battery or transmitting contact 336, key 307, wire 340 to L³, over that to union 374, wire 376, contact 381, wire 382, to armature 383 of relay 372, (the passage over contact 477, is not open and contact 735 leads into another circuit that will give no passage for this current) over armature 383 of relay 372, which is attracted) wire 497, (it cannot flow over wire 492 and through intermittent coils to earth as that is again an open circuit) further over wire 497, contact 498, pair of magnet coils 499, wire 501 to L¹, over that to wire 341, key 307, over return wire contact 339, return wire contact spring 337, which latter are touching one another, over wire 369 to zinc pole of battery 258. The intermittent relays are now released.

This operation sets the telephone apparatus, and the telephone connection is now to be traced from L³ only, as the first part is already described up to union 374 at L³, and the current flows from there over wire 376, contact 381, wire 382, union 475, contact 735, wire 736, over wire 739, contact 740, (which is open for passage) wire 741, contact 742, wire 394, over key 395 and wire 396 to L³ again, and over that on its mission of setting all the next following stations until reaching the wanted station, which is then set in just the same way as described for the telephone communication by central station with a single party on the line, that is to say, the main testing apparatus is not set at any of the stations to be set for telephone communication, but only the first telephone apparatus. It is only at the subscriber's station nearest the central station that both the first telephone apparatus and second telephone apparatus are set.

After the setting of both stations to communicate together both are rung up at the same time, and communication takes place between the two subscribers. The key 395 is not depressed in this case either, when talking.

Resetting the first telephone apparatus, the second telephone apparatus and of the main testing apparatus, is performed for all subscribers at the same time, or for any number of them, according to the number that has been set, by depressing key 304. The circuit for this operation is L¹ and L³. The current flows out from battery 258, over transmitting or battery contact 296, key 304, wire 252, contact 253 and out over L¹, entering at the subscriber's station at union 539, wire 746, over contact of armature 725, wire 747, union 750, from which it can now divide and flow over three different wires, leading over the different apparatus above named, if they are all open for the current passage. Assuming they are, the first part can flow over wire 751, contact 752, wire 753 to coil 399. The second division goes from union 749, over wire 754, contact 755, wire 756, union 757, wire 753 to same coil. The third division goes also from union 749, over wire 758, contact 759, over wire 760 and wire 753 to same point. The current coming over all three divisions will flow through that coil simultaneously and over wire 761 and union 762 to L³, back over that line to the central station where it flows in at union 763, wire 311 and over the key 304 as afore described and back to zinc pole of battery 258.

At the same moment that current passed through coil 399, it energizes it and attracts the armature 764 against post 765, whereby a local circuit is closed from battery 194 over wires 342 and 633, union 766, wire 767, armature 764 and post 765, wire 768, contact 769, and through magnet coil 634, over wire to union 770, wire 585 to zinc pole of battery 194. The passage of this local current through magnet coil 634, shifts the main testing apparatus over in normal position, opening the circuit over contact 769 but opening another over contact 771, wire 772, contact 773, through second winding of coils 499, wire 774 to union 775, over wire 211 to zinc pole.

The second telephone apparatus was by the passage of this local current through coils 499 shifted over to normal position, the contact 773 was closed and 776, was opened for passage, so said local current flows farther as long as the contact period at the central station lasts, over wire 777, contact 778, through magnet coils 729, wire 779 to union 775 and over wire 211 to zinc pole of battery 194. This resets the first telephone apparatus, and when that rocked over into normal position, the last path was closed for that local current, as was also the path for the resetting current, over L¹ and L³.

If only a single one of these apparatus has been set, the current will go over that to coil 399, and set the apparatus that is open for the resetting current.

Should tests or telephone communication be going on with a station out on the line, and a burglar or a fire alarm signal be set off at a station between the one in communication and the central station no signaling current impulses take the circuit L¹ and L³, but follow the path destined and open for them. But when all the apparatus, above named, are in normal position it will be seen that said path between L¹ and L³ is closed.

It will also be seen that in the few cases that a current flows out on the line unrestrainedly, it is only of brief duration, till the operation snaps it off again, and then again the weak impulses that escape come nowhere in circuit or connection with the signaling mechanism, and can absolutely not interfere with that, so if the mechanism be set off for signaling the fire or the burglar alarms, it is completely prevented from being reset untimely in any way, and their signals will immediately be noticed at the central station.

*The constant balancing current.*—The balancing battery current which announces the interruptions and groundings of L¹ and L² as soon as they are cut or grounded, is installed at the extreme end of the lines, (Fig. 5) and sends a constant current over L¹ to central station over union 253, Fig. 8, wire 252, over key 304, wire 312 contact pairs 250, 249, and 308, over wire 248 coils 186 and 187, wire 255, key 301, wire 264 and back over L² to zinc pole battery 189. That would keep the magnet bar 175 of apparatus 168 constantly attracted against coil 187, but the balancing current from battery 185 entering the same coils in an inverse direction annihilate the effect of the first said current and keep the said bar 175 straight between said two coils 186 and 187 when that balancing current is switched in. As the signaling attachment is exactly the same installation as that attached to apparatus 169, Fig. 7, I refer to that for references as to the operation which is the following: At the moment burglar and fire alarm be cut as the lever 527, (Fig. 7) will be thrown over against contacts 183 and 184 and remain there, giving one continuous signal on both of the audible and visual signaling apparatus, 171 and 172 by the overbalancing force of the battery 185, when said counterbalancing current be cut, until switch 188, (Fig. 8) has been thrown off. Such a continuous signal indicates that the line or lines are cut.

This said constant current will be interrupted automatically by any operation being performed on the lines, but by the setting of the telephone apparatus it is only for the instant it takes to set that installation, as the telephone circuit, when set, is L³ and earth. When the burglar or the fire alarm signaling apparatus are actuated and one of them is set that one cuts the connection from that station to the far side.

In a test either one or the other of the burglar or fire alarm signaling apparatus is set. The energization of the intermittent relays is done over L³ and will interrupt the constant current an instant at the posts 726 and 781 of relays 373 and 387; thereafter certain of the next following operations may interrupt it while in performance, so that all are made to coöperate together, making interchangings, interruptions and connections under all conditions.

My described apparatus and coöperative mechanism is particularly designed for greatly amplifying the use of automatic apparatus and operation in the electrical industry, for the construction of new systems and extended exchange combinations at local and distant points, and for the interconnection of a number of useful installations to act in conjunction to quite appreciable advantages. I desire it understood that changes in the details of construction, combination and arrangements of parts may be made without departing from the spirit of the invention and scope of the appended claims.

Having thus fully described my said invention, what I claim as new and desire to secure by Letters Patent, is:

1. The combination with a multi-station electrical system, of a source of electrical energy and a multi-switching device connected therewith comprising double wound electromagnetic coils, fixed inductive magnet bars associated with said electromagnet coils, an oscillatory permanent magnet bar between said fixed inductive magnet bars, a third magnet inductive bar associated with one of said fixed inductive magnet bars, means for energizing said fixed magnet bars with current of opposite polarity, and means for changing the direction of current through the windings of said electromagnetic coils, said fixed magnet bars associated with said permanent magnet to act upon the same as an armature to said electromagnets under the influence of a strong magnetic force, substantially as set forth.

2. The combination with a multi-station electrical system, of a source of electrical energy and a multi-switching device connected therewith comprising double wound electromagnetic coils, fixed inductive magnet bars associated with said electromagnet coils, an oscillatory permanent magnet bar between said fixed inductive magnet bars, a third magnet inductive bar associated with one of said fixed inductive magnet bars, an arch shaped rail mounted on said oscillatory permanent magnet bar, a plurality of contact plates with dielectric spaces therebetween on said rail, a plurality of contacts disposed in pairs on either side of said rail, conductors connected to said contacts, means for moving said rail, said rail moving means adapted for positioning said conductive and dielectric members between said contacts, means for opening and closing a plurality of circuits over said contacts and dielectrics, with one current impulse, substantialy as set forth.

3. The combination with a multi-station electrical system, of a source of electrical energy, and a multi-switching device connected therewith comprising double wound electromagnetic coils, inductive magnet bars fixed to the poles of said electromagnetic coils, an oscillatory permanent magnet bar movable between said electromagnetic coils, an arch shaped rail mounted on said oscillatory permanent magnet bar, a plurality of contact plates with dielectrics therebetween on said rail, a plurality of contacts disposed in pairs on either side of said rail, conductors connected to said contacts, one pair of said contacts being normally closed and connected to the main service line, and another pair of said contacts having connection with said open pair of contacts, means for maintaining current through said magnet coils to earth while said rail moves between said contacts, means for actuating said rail, and means for making multi-connections with one current impulse, substantially as set forth.

4. The combination with a multi-station electrical system, of a source of electrical energy, a multi-switching device connected therewith comprising double wound electromagnetic coils, inductive magnet bars fixed to the poles of said electromagnetic coils, an oscillatory permanent magnet bar movable between said magnet inductive bars, an arch shaped rail mounted on said oscillatory permanent magnet bar having a plurality of contacts and dielectrics therebetween, a plurality of fixed contacts disposed in pairs on either side of said rail contacts, conductors connected to said fixed contacts, one pair of said contacts being normally closed and connected to the main service line, and another pair of said contacts having connection with said open pair of contacts, means associated with said contacts to maintain current passage through said magnet coils to earth during the operative period of the rail, and means for resetting said rail, means for changing the course of the resetting current, and means for making multi-connections with one current impulse, substantially as set forth.

5. In a multi-station electrical system the combination of, a source of electrical energy, a multi-switching device connected therewith comprising double wound electromagnetic coils, inductive magnet bars fixed to the poles of said electromagnetic coils, an oscillatory permanent magnet bar movable between said magnet inductive bars, a pair of normally open contacts coöperating with said switching device, a pair of normally closed contacts having connection with said open contact pair and an armature of said electromagnet coils, an armature post connected to one winding of the electromagnet coils, an armature post connected to the main line source of energy, means for setting the switching device, means for interrupting the first impulse of the setting current, means for establishing a course for said current impulse from the closed contact pair over the open contact pair, said armature posts, and through the electromagnet coils armature to earth, means for maintaining said coil's armature attracted and said setting current flowing through said coils to earth during the entire contact period, means for releasing the coil's armature, means for bridging the next following current impulse over said coil's armature and the armature post to the main line, means for preventing one contact impulse from flowing into the main line to new stations during a fraction of its contact period, means for establishing connection at each station for each new impulse, means for singling out any station for testing or telephone operations, and means for locking out intermediate stations while establishing connections with others, substantially as set forth.

6. In a multi-station electrical system the combination of a source of electrical energy, a multi-switching device comprising double wound electromagnetic coils, inductive magnet bars, an oscillatory permanent magnet bar between said inductive bars, a pair of normally open contacts adjacent the multi-switching device, a pair of normally open contacts adjacent the multi-switching device connected to said open contacts and to an armature of the electromagnet coils, an armature post connected to one winding of the electromagnet coils, an armature post connected to earth, means for resetting the switching attachment, and for attracting the armature of the electromagnet coils, means for interrupting the resetting current's first open course through coils to earth, means for establishing a course for current over contact pair, over armature of electromagnet coils, over said armature post and through electromagnet coils to earth, means for maintaining attracted said coil's armature, means for maintaining the resetting current flowing to earth, means for releasing the coil's armature, means for bridging the next current impulse over said coil's armature and armature post, means for preventing one current impulse from flowing to a new station during the contact period, means for establishing through connection at each station for each new impulse, and means to stop the resetting of any station or select any station by current impulses, substantially as set forth.

7. In a multi-station electrical system the combination of a source of electrical energy, a multi-switching device comprising double wound electromagnetic coils having pole pieces, inductive magnet bars fixed to the poles of said electro-magnet coils, an oscillatory permanent magnet bar between said inductive bars, a plurality of pairs of contact members, magnet coils disposed on either side of said switching device, plungers in said coils, connections between said plungers and the respective ends of the permanent magnet bars, an armature at each plunger coil having side inductive bars to reinforce the attraction on said armatures, two pairs of contacts for setting and resetting operations, means for energizing said coils individually and to attract the coil's armature, means for actuating the permanent magnet bar, means for energizing one of the plunger coils by the line current, means for actuating the other plunger coil by a local circuit, means for sending current impulses for setting or resetting a plurality of stations in one contact period, and means for operating said plurality of pairs of contact members, substantially as set forth.

8. In a multi-station electrical system, the combination of a source of electrical energy, multi-switching devices comprising members having conducting and dielectric strips, a plurality of pairs of contacts associated with said switching devices, conductor wirings leading from said contact members forming local and distant line circuits, means for actuating said switching devices for selecting contacts for local or distant communication, and means for effecting communication between the separate stations of the respective multi-station systems, substantially as set forth.

In witness whereof, I have hereunto set my hand at Brooklyn, New York, this second day of July, A. D., nineteen hundred and fifteen.

OTTO ASMUSSEN.

Witnesses:
　LOUIS H. KRUGER,
　AUGUST OGAURD.